(12) United States Patent
Chi et al.

(10) Patent No.: US 10,942,320 B2
(45) Date of Patent: Mar. 9, 2021

(54) DISPERSION COMPENSATION FOR LIGHT COUPLING THROUGH SLANTED FACET OF OPTICAL WAVEGUIDE

(71) Applicant: Facebook Technologies, LLC, Menlo Park, CA (US)

(72) Inventors: Wanli Chi, Sammamish, WA (US); Hee Yoon Lee, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/684,009

(22) Filed: Nov. 14, 2019

(65) Prior Publication Data

US 2020/0257065 A1    Aug. 13, 2020

Related U.S. Application Data

(60) Provisional application No. 62/804,119, filed on Feb. 11, 2019.

(51) Int. Cl.
| | |
|---|---|
| *G02B 6/42* | (2006.01) |
| *G02B 27/01* | (2006.01) |
| *G02F 1/225* | (2006.01) |

(52) U.S. Cl.
CPC ........... *G02B 6/4214* (2013.01); *G02B 6/423* (2013.01); *G02B 6/4244* (2013.01); *G02B 27/017* (2013.01); *G02F 1/2257* (2013.01); *G02B 6/4243* (2013.01); *G02B 6/4246* (2013.01)

(58) Field of Classification Search
CPC .... G02B 6/4214; G02B 6/423; G02B 6/4244; G02B 6/4243; G02B 6/4246; G02B 27/017; G02F 1/2257

USPC .......................................................... 385/14
See application file for complete search history.

(56) References Cited

U.S. PATENT DOCUMENTS

| | | | |
|---|---|---|---|
| 2001/0003473 A1 | 6/2001 | Galabova et al. | |
| 2007/0177275 A1 | 8/2007 | McGuire, Jr. | |
| 2009/0184889 A1* | 7/2009 | Kier ......................... | G02B 5/32 345/8 |
| 2010/0110386 A1 | 5/2010 | Handschy et al. | |
| 2011/0273770 A1 | 11/2011 | Poon et al. | |
| 2013/0321913 A1 | 12/2013 | Harrold et al. | |
| 2016/0041384 A1* | 2/2016 | Robbins .................. | G06F 3/013 345/156 |
| 2017/0045744 A1 | 2/2017 | Amitai | |
| 2017/0108697 A1* | 4/2017 | El-Ghoroury ...... | G02B 27/0081 |

(Continued)

FOREIGN PATENT DOCUMENTS

EP            3413117 A2     12/2018

OTHER PUBLICATIONS

Facebook Technologies, LLC, International Search Report and Written Opinion, PCT/US2020/017206, dated Sep. 1, 2020, 17 pgs.

(Continued)

*Primary Examiner* — Jerry M Blevins
(74) *Attorney, Agent, or Firm* — Morgan, Lewis & Bockius LLP

(57) ABSTRACT

An optical device (e.g., a pupil expander) includes a waveguide with a slanted facet. The optical device includes a reflector on the slanted facet and a prism, or a grating at the slanted facet. The prism or the grating compensates for the dispersion of an image light from a display, which reduces smearing of displayed images. The waveguide can be configured for pupil replication in one-dimension or two-dimensions.

20 Claims, 14 Drawing Sheets

(56) References Cited

U.S. PATENT DOCUMENTS

| | | | |
|---|---|---|---|
| 2017/0363811 A1* | 12/2017 | Ayres | G02B 6/2773 |
| 2018/0067315 A1 | 3/2018 | Amitai et al. | |
| 2018/0328553 A1* | 11/2018 | Lim | G02B 6/0038 |
| 2020/0058266 A1* | 2/2020 | Fu | G09G 5/06 |

OTHER PUBLICATIONS

Facebook Technologies, LLC, Invitation to Pay Additional Fees, PCT/US2020/017206, dated Aug. 14, 2020, 12 pgs.

\* cited by examiner

US 10,942,320 B2

DISPERSION COMPENSATION FOR LIGHT COUPLING THROUGH SLANTED FACET OF OPTICAL WAVEGUIDE

RELATED APPLICATIONS

This application claims the benefit of, and priority to, U.S. Provisional Patent Application Ser. No. 62/804,119, filed Feb. 11, 2019, which is incorporated by reference herein in its entirety.

TECHNICAL FIELD

This relates generally to display devices, and more specifically to head-mounted display devices.

BACKGROUND

Head-mounted display devices (also called herein head-mounted displays) are gaining popularity as means for providing visual information to a user. For example, the head-mounted display devices are used for virtual reality and augmented reality operations.

Displays with large field of view (FOV) are desired in head-mounted displays. A large FOV allows for the user to be fully immersed in the virtual reality or augmented reality environment and experience a scene similar to one that a user may experience in the real world.

SUMMARY

Accordingly, there is a need for head-mounted display devices with an increased FOV. Such head-mounted display devices will enhance user experience with virtual reality and/or augmented reality operations.

The above deficiencies and other problems associated with conventional head-mounted displays are reduced or eliminated by the disclosed devices.

In accordance with some embodiments, an optical device includes an optical waveguide that has a first optical surface and a second optical surface opposite to the first optical surface. Both the first optical surface and the second optical surface extend from a first end of the optical waveguide to a second end of the optical waveguide that is opposite to the first end of the optical waveguide. The optical waveguide also has a slanted facet adjacent to the first end of the optical waveguide. The slanted facet is non-parallel and non-perpendicular to the first optical surface and the second optical surface. The optical device also includes a reflector on the slanted facet of the optical waveguide and a prism located adjacent to the first end of the optical waveguide and separate from the optical waveguide.

In accordance with some embodiments, an optical waveguide has a first optical surface and a second optical surface opposite to the first optical surface. Both the first optical surface and the second optical surface extend from a first end of the optical waveguide to a second end of the optical waveguide that is opposite to the first end of the optical waveguide. The optical waveguide also has a slanted facet adjacent to the first end of the optical waveguide. The slanted facet is non-parallel and non-perpendicular to the first optical surface and the second optical surface. The slanted facet includes a grating.

Thus, the disclosed embodiments provide display devices with a large field of view. In some embodiments, the display devices are head-mounted display devices.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

Figure 1:
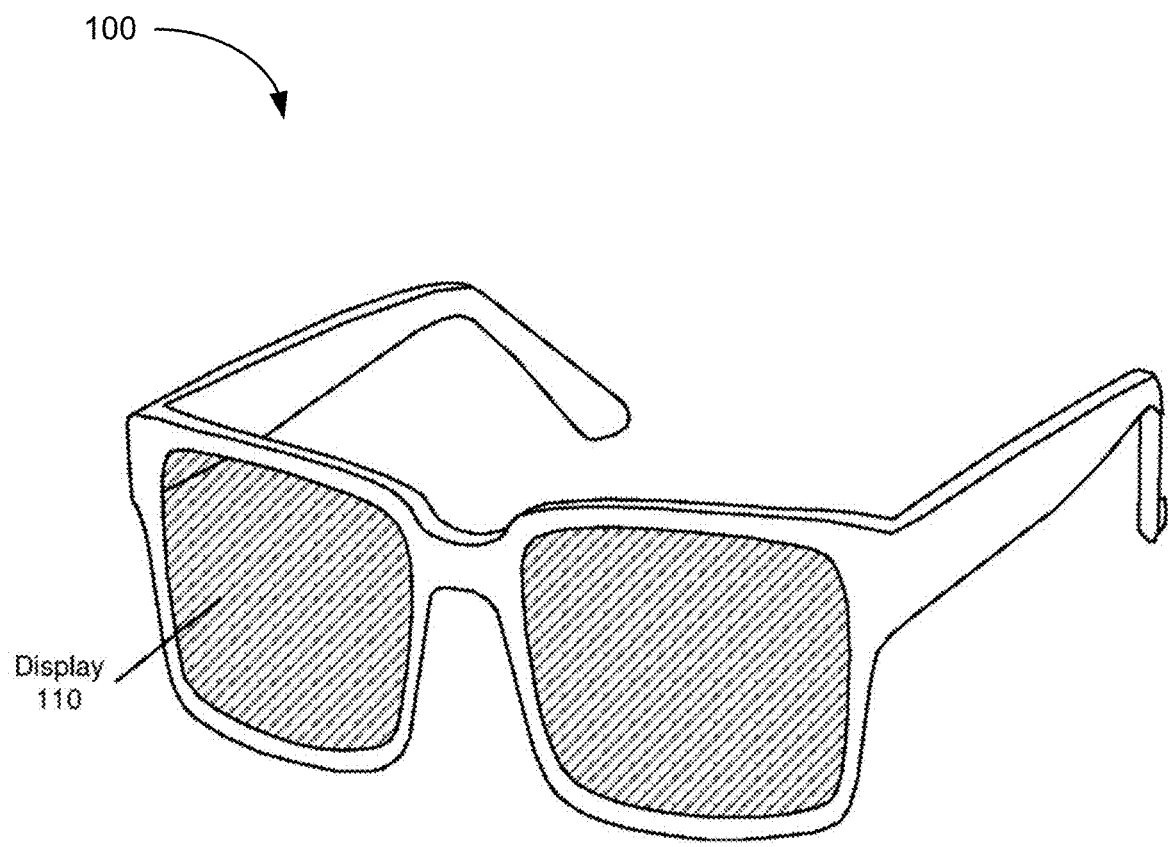
FIG. 1 is a perspective view of a display device in accordance with some embodiments.

These figures are not drawn to scale unless indicated otherwise.

DETAILED DESCRIPTION

There is a need for head-mounted display devices with a large FOV for enhancing user experience with virtual reality and/or augmented reality operations. An increased FOV can be achieved by coupling light from a light source into a slanted facet of an optical waveguide such that the principal direction of the coupled light is non-perpendicular to the slanted facet of the optical waveguide, thereby increasing the input acceptance angle of the optical waveguide of the display device. However, this can lead to increased dispersion of the coupled light and may cause smearing of an image displayed by the light. A prism or a grating can be used as an input coupler in order to prevent or reduce dispersion and smearing of an image displayed by the light.

The present disclosure provides display devices configured to direct light to an eyebox or an eye of a user with a large field of view while reducing or eliminating dispersion.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first optical surface could be termed a second optical surface, and, similarly, a second optical surface could be termed a first optical surface, without departing from the scope of the various described embodiments. The first optical surface and the second optical surface are both optical surfaces, but they are not the same optical surface.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1 illustrates display device 100 in accordance with some embodiments. In some embodiments, display device 100 is configured to be worn on a head of a user (e.g., by having the form of spectacles or eyeglasses, as shown in FIG. 1) or to be included as part of a helmet that is to be worn by the user. When display device 100 is configured to be worn on a head of a user or to be included as part of a helmet, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user). As shown in FIG. 1, display device 100 includes display 110. Display 110 is configured for presenting visual contents (e.g., augmented reality contents, virtual reality contents, mixed reality contents, or any combination thereof) to a user.

Figure 2:
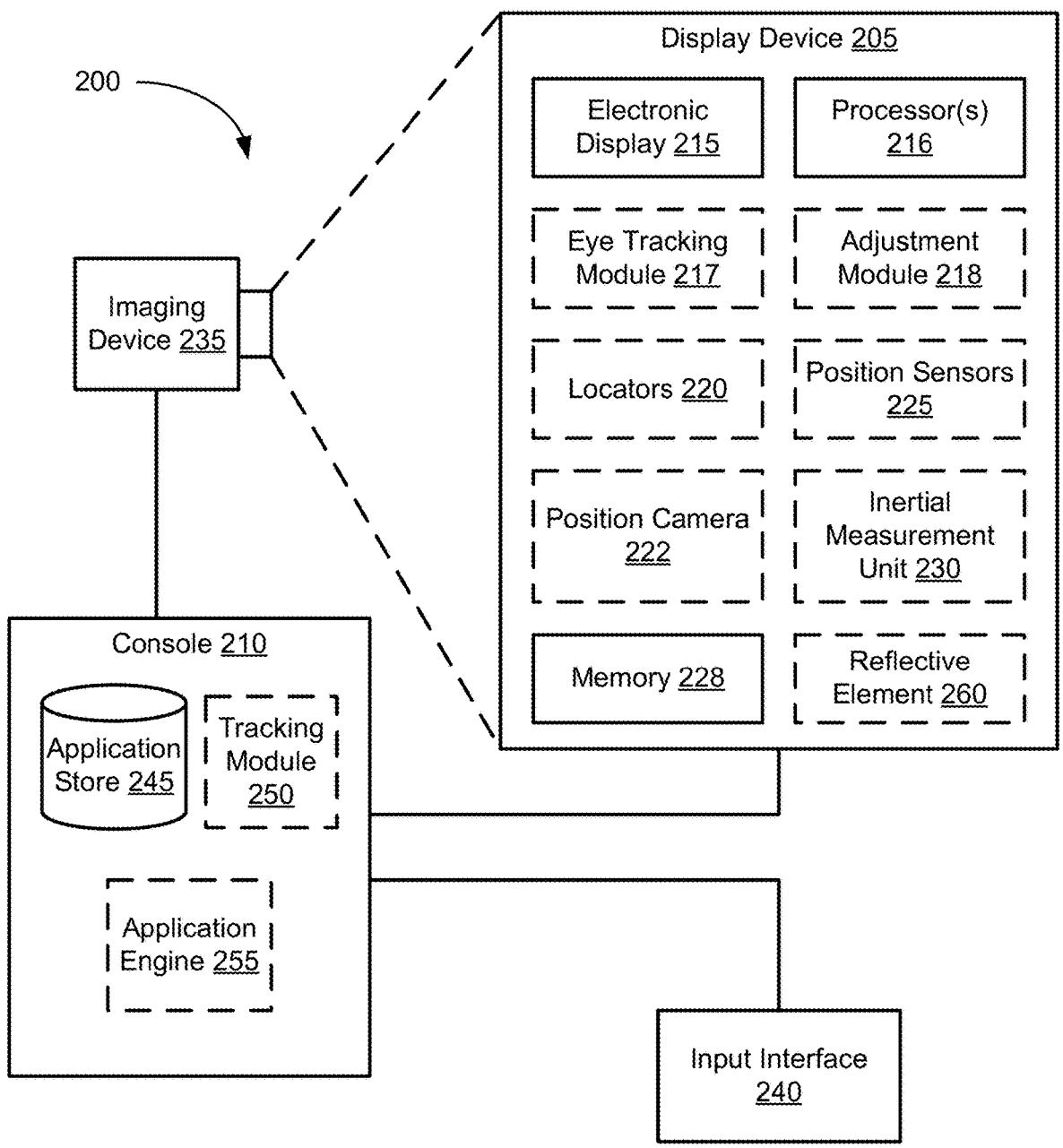
FIG. 2 is a block diagram of a system including a display device in accordance with some embodiments.

In some embodiments, display device 100 includes one or more components described herein with respect to FIG. 2. In some embodiments, display device 100 includes additional components not shown in FIG. 2.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including one display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver augmented reality, virtual reality, and mixed reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in an augmented environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an augmented reality (AR) device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, one or more reflective elements 260 or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable display element or multiple adjustable display elements (e.g., a display for each eye of a user). In some embodiments, electronic display 215 is configured to display images to the user by projecting the images onto one or more reflective elements 260.

In some embodiments, the display element includes one or more light emission devices and a corresponding array of spatial light modulators. A spatial light modulator is an array of electro-optic pixels, opto-electronic pixels, some other array of devices that dynamically adjust the amount of light transmitted by each device, or some combination thereof. These pixels are placed behind one or more lenses. In some embodiments, the spatial light modulator is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The spatial light modulator is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array. In some embodiments, electronic display 215 projects images to one or more reflective elements 260, which reflect at least a portion of the light toward an eye of a user.

One or more lenses direct light from the arrays of light emission devices (optionally through the emission intensity arrays) to locations within each eyebox and ultimately to the back of the user's retina(s). An eyebox is a region that is occupied by an eye of a user located proximity to display device 205 (e.g., a user wearing display device 205) for viewing images from display device 205. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off the surfaces of the eye is used to also determine location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described herein.

Adjustment module 218 generates an image frame based on the determined locations of the pupils. In some embodiments, this sends a discrete image to the display that will tile subimages together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display to not pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light toward the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

In some embodiments, display device 205 optionally includes one or more reflective elements 260. In some embodiments, electronic display device 205 optionally includes a single reflective element 260 or multiple reflective elements 260 (e.g., a reflective element 260 for each eye of a user). In some embodiments, electronic display device 215 projects computer-generated images on one or more reflective elements 260, which, in turn, reflect the images toward an eye or eyes of a user. The computer-generated images include still images, animated images, and/or a combination thereof. The computer-generated images include objects that appear to be two-dimensional and/or three-dimensional objects. In some embodiments, one or more reflective elements 260 are partially transparent (e.g., the one or more reflective elements 260 have a transmittance of at least 15%, 20%, 25%, 30%, 35%, 40%, 45%, or 50%), which allows transmission of ambient light. In such embodiments, computer-generated images projected by electronic display 215 are superimposed with the transmitted ambient light (e.g., transmitted ambient image) to provide augmented reality images.

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described herein may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in an augmented environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

Figure 3:
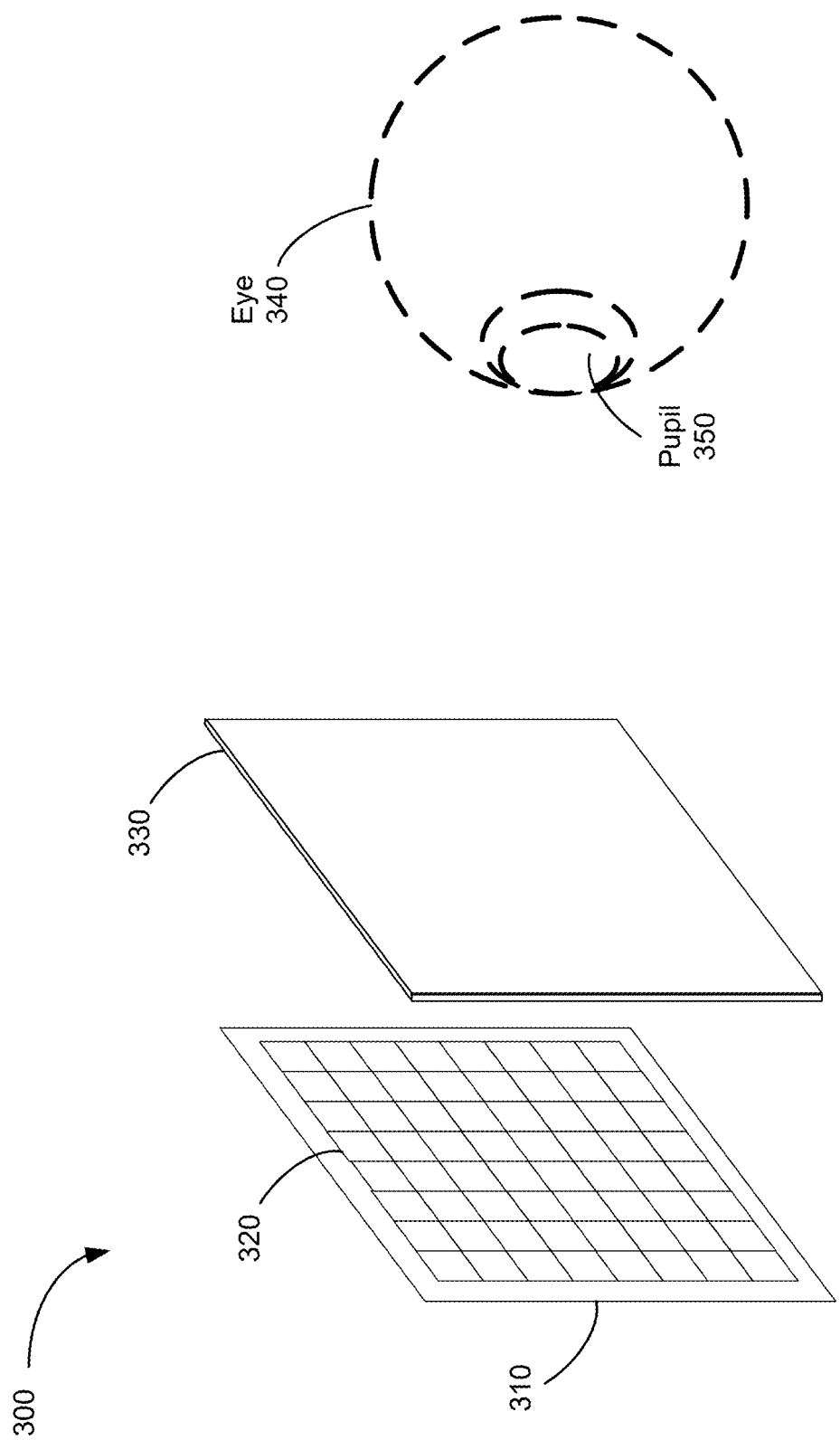
FIG. 3 is an isometric view of a display device in accordance with some embodiments.

FIG. 3 is an isometric view of display device 300 in accordance with some embodiments. In some other embodiments, display device 300 is part of some other electronic display (e.g., a digital microscope, a head-mounted display device, etc.). In some embodiments, display device 300 includes light emission device array 310 and one or more lenses 330. In some embodiments, display device 300 also includes an IR detector array.

Light emission device array 310 emits image light and optional IR light toward the viewing user. Light emission device array 310 may be, e.g., an array of LEDs, an array of microLEDs, an array of OLEDs, or some combination thereof. Light emission device array 310 includes light emission devices 320 that emit light in the visible light (and optionally includes devices that emit light in the IR).

In some embodiments, display device 300 includes an emission intensity array configured to selectively attenuate light emitted from light emission device array 310. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner, the emission intensity array is able to control what portion of the image light emitted from light emission device array 310 is passed to the one or more lenses 330. In some embodiments, display device 300 uses an emission intensity array to facilitate providing image light to a location of pupil 350 of eye 340 of a user, and minimize the amount of image light provided to other areas in the eyebox.

One or more lenses 330 receive the modified image light (e.g., attenuated light) from emission intensity array (or directly from light emission device array 310), and direct the modified image light to a location of pupil 350.

An optional IR detector array detects IR light that has been retro-reflected from the retina of eye 340, a cornea of eye 340, a crystalline lens of eye 340, or some combination thereof. The IR detector array includes either a single IR sensor or a plurality of IR sensitive detectors (e.g., photodiodes). In some embodiments, the IR detector array is separate from light emission device array 310. In some embodiments, the IR detector array is integrated into light emission device array 310.

In some embodiments, light emission device array 310 and an emission intensity array make up a display element. Alternatively, the display element includes light emission device array 310 (e.g., when light emission device array 310 includes individually adjustable pixels) without the emission intensity array. In some embodiments, the display element additionally includes the IR array. In some embodiments, in response to a determined location of pupil 350, the display element adjusts the emitted image light such that the light output by the display element is refracted by one or more lenses 330 toward the determined location of pupil 350, and not toward other locations in the eyebox.

In some embodiments, display device 300 includes one or more broadband sources (e.g., one or more white LEDs) coupled with a plurality of color filters, in addition to, or instead of, light emission device array 310.

Figure 4:
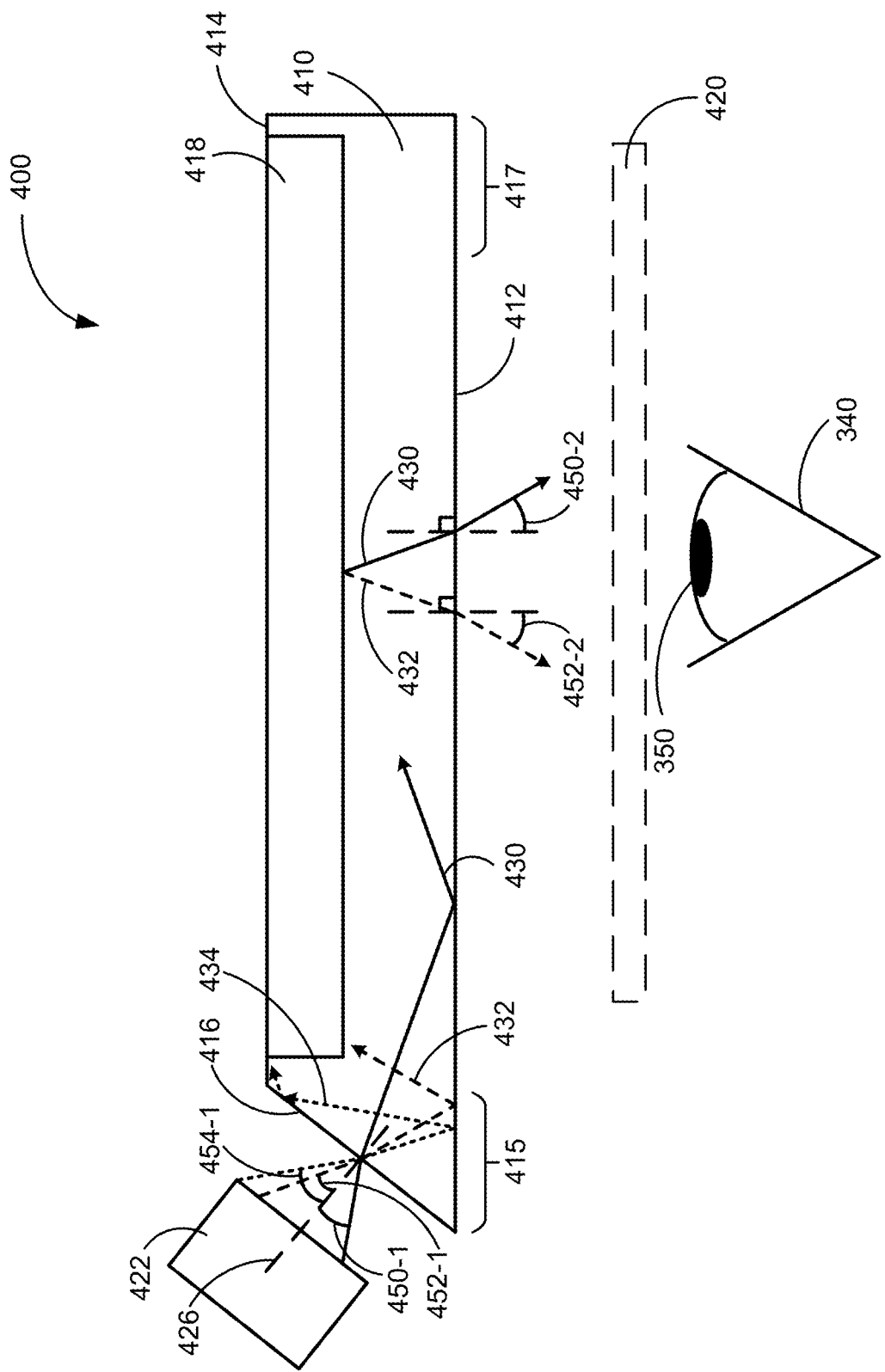
FIG. 4 illustrates an optical device in accordance with some embodiments.

FIG. 4 illustrates optical device 400 in accordance with some embodiments.

In FIG. 4, optical device 400 includes optical waveguide 410. Optical waveguide 410 has a first optical surface 412 and a second optical surface 414. In some embodiments, second optical surface 414 is substantially parallel to first optical surface 412 (e.g., second optical surface 414 and first optical surface 412 form an angle less than 1 arcminute). In some embodiments, second optical surface 414 is parallel to first optical surface 412. Optical waveguide 410 has two ends 415 and 417. First end 415 has a slanted facet 416 that is non-perpendicular and non-parallel to first optical surface 412 and second optical surface 414. Optical waveguide 410 also includes one or more output couplers 418 that are located along second optical surface 414. Optical waveguide 410 is configured to receive light from a light projector 422. In FIG. 4, rays 430, 432, and 434 are output by light projector 422 and received by slanted facet 416 of optical waveguide 410. Rays 430, 432, and 434 are coupled into (e.g., enter) optical waveguide 410 through slanted facet 416.

Ray 430 enters optical waveguide 410 at input angle 450-1. Ray 432 enters optical waveguide 410 at input angle 452-1. Ray 434 enters optical waveguide 410 at input angle 454-1. Input angle 454-1 of ray 434 is larger than input angle 450-1 of ray 430 and input angle 452-1 of ray 432. Rays 430, 432, and 434 enter optical waveguide 410 through slanted facet 416 and are reflected at first optical surface 412 via total internal reflection. Ray 434 is reflected by first optical surface 412 toward slanted facet 416 from inside the waveguide. Ray 434 is reflected by slanted facet 416 and becomes stray light. In some embodiments, such as when the light projector 422 has a field of view that is within angles 450-1 and 454-1, stray light due to reflection at slanted surface 416 may be negligible.

Rays 430 and 432 are reflected at first optical surface 412 and travel toward second optical surface 414. Rays 430 and 432 are incident on at least a portion of the one or more output couplers 418. The one or more output couplers 418 redirect at least a portion of ray 430 and at least a portion of ray 432. The portions of rays 430 and 432 that are redirected by the one or more output couplers 418 are incident on first optical surface 412 at an angle that does not meet the conditions for total internal reflection (e.g., the incident angle is less than the critical angle). Thus, the portions of rays 430 and 432 that are redirected by the one or more output couplers 418 exit optical waveguide 410 through first optical surface 412 and are directed to eyebox 420 and/or to the pupil 350 of the eye 340 of the user. The portion of ray 430 that is redirected to eyebox 420 (at least partially) exits optical waveguide 410 at exit angle 450-2, corresponding to input angle 450-1. The portion of ray 432 that is redirected to eyebox 420 exits optical waveguide 410 at exit angle 452-2, corresponding to input angle 452-1. In some embodiments, exit angle 450-2 is the same as input angle 450-1 and exit angle 452-2 is the same as input angle 452-1.

In some embodiments, light projector 422 provides light in a direction that is substantially perpendicular to slanted facet 416 of optical waveguide 410 (e.g., an optical axis of the light projected by light projector 422 and slanted facet 416 form an angle less than less than 1 arcminute).

As shown in FIG. 4, optical device 400 enables directing light from a light projector (e.g., light projector 422) to an eyebox (e.g., eyebox 420) or to an eye of a user. As used herein, an input angular spread refers to a range of angles of input light that is coupled into an optical device (e.g., optical device 400). As used herein, an exit angular spread refers to a range of angles of light that is output from the optical device (e.g., optical device 400). In some cases, as shown in FIG. 4, the input angular spread of optical device 400 is a sum of input angles 450-1 and 452-1, and the exit angular spread of optical device 400 is a sum of exit angles 450-2 and 452-2. In some embodiments, the exit angular spread corresponds to the input angular spread. In some cases, the exit angular spread is the same as the input angular spread. In some cases, the FOV of an optical device is determined by the exit angular spread of the optical device. In order to increase the FOV of optical device 400, light projector 422 may be tilted with respect to slanted facet 416 of optical waveguide 410 so that the principal direction of light from light projector 422 is non-perpendicular to slanted facet 416. Tilting light projector 422 relative to slanted facet 416 allows the FOV of optical device 400 to be increased. In some cases, the optical axis 426 of the light projected by light projector 422 and the surface normal to slanted facet 416 form an angle as large as 30 degrees. However, coupling light output from light projector 422 into optical waveguide 410 when light projector 422 is tilted relative to slanted facet 416 of optical waveguide 410 can lead to dispersion and/or smearing of an image displayed by the light.

Thus, there is a need for an in-coupling mechanism for coupling light from a light projector (e.g., light projector 422) into an optical waveguide (e.g., optical waveguide 410), that allows for an increased FOV and compensates for dispersion in order to prevent or reduce smearing of an image displayed by the light.

We now turn to certain embodiments of an optical device, configured to direct light from a projector (e.g., light projector 422) to an eyebox (e.g. eyebox 420) with increased FOV such that rays entering optical waveguide 410 at large input angles (e.g., angle 454-1) are directed to the eyebox and/or the pupil of the eye of the user. The optical device is further configured to compensate for dispersion.

Figure 5A:
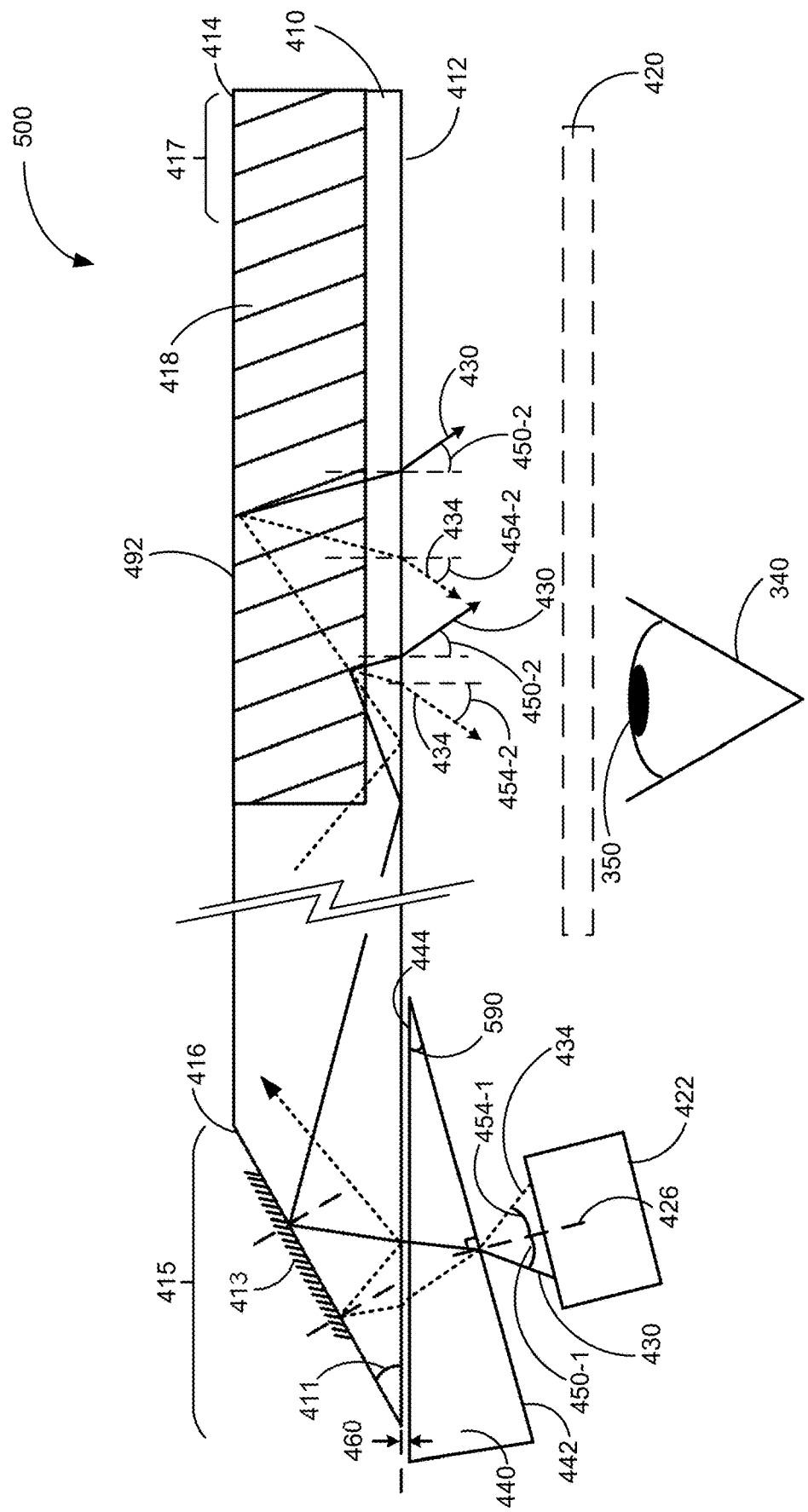
FIGS. 5A-5C illustrate optical devices in accordance with some embodiments.
Figure 5B:
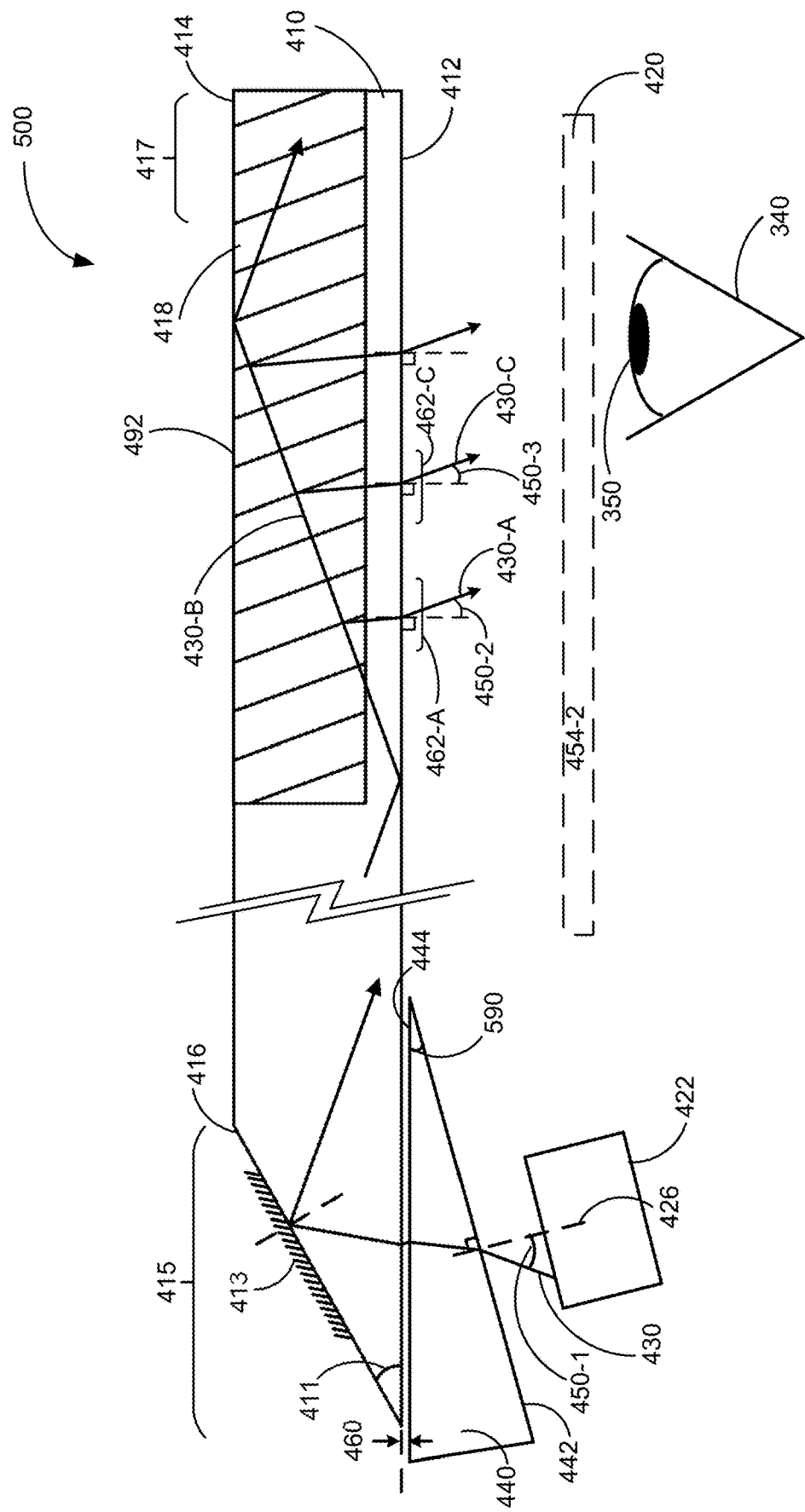
Figure 5C:
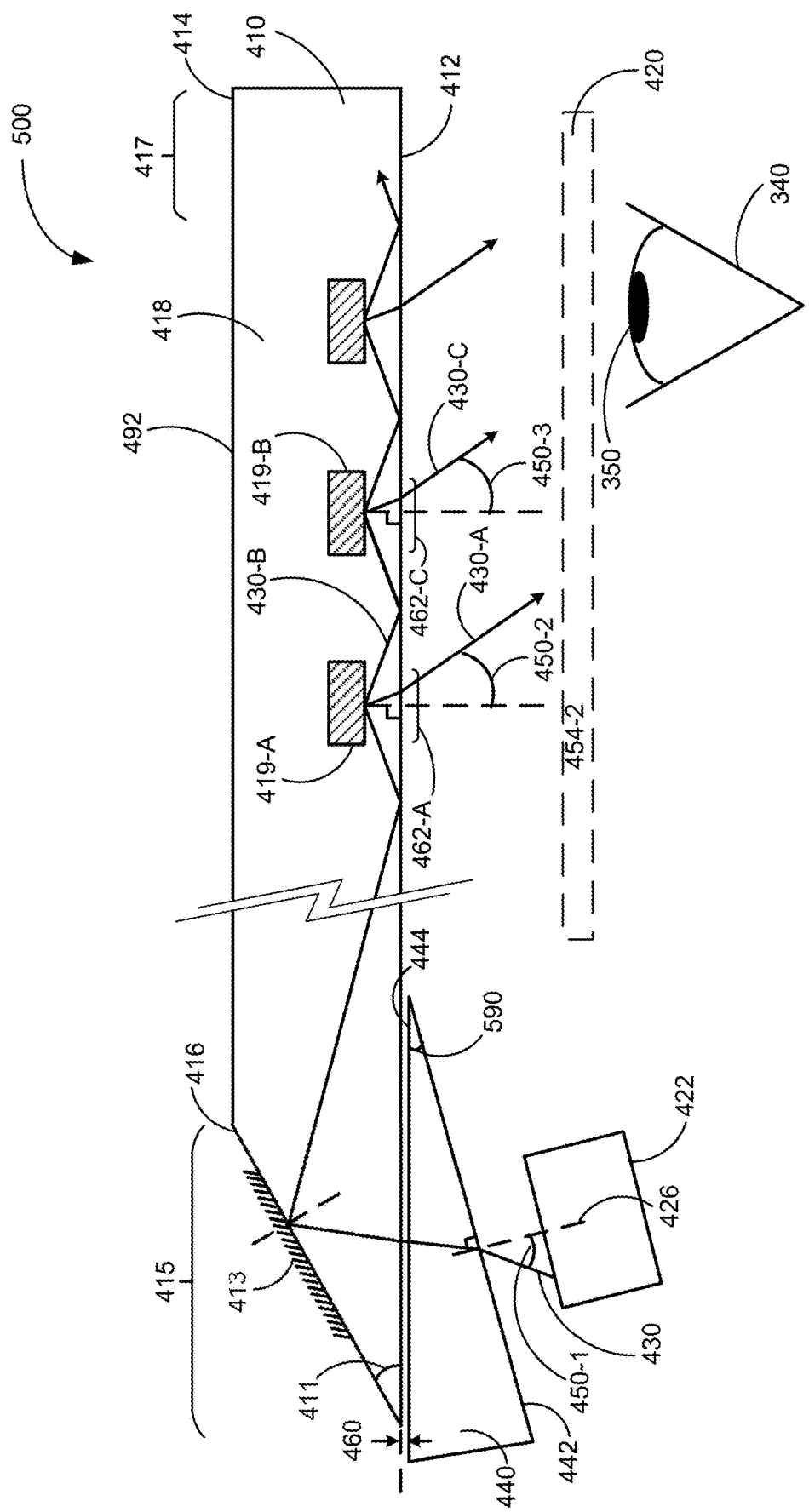

FIGS. 5A-5C illustrate optical devices in accordance with some embodiments.

Referring to FIG. 5A, optical device 500 includes optical waveguide 410, as described above. Slanted facet 416 of optical waveguide 410 has a reflector 413 configured to reflect light incident on slanted facet 416 (e.g., from within the waveguide). Optical device 500 also includes a prism 440 that has a first optical surface 442 and a second optical surface 444. Optical device 500 also includes light projector 422. Light (e.g., rays 430 and 434) output by light projector 422 is transmitted though prism 440 before being coupled into (e.g., entering) optical waveguide 410 through first optical surface 412 of optical waveguide 410. Prism 440 is configured to receive light (e.g., rays 430 and 434) from light projector 422 through first optical surface 442. Prism 440 is further configured to direct the light (e.g., rays 430 and 434) toward optical waveguide 410. The light (e.g., rays 430 and 434) exits prism 440 through second optical surface 444 and enters optical waveguide 410 through first optical surface 412 of optical waveguide 410. Prism 440 is further configured to compensate for dispersion of light that is coupled into optical waveguide 410.

The light (e.g., rays 430 and 434) in optical waveguide 410 is reflected at slanted facet 416 (e.g., by reflector 413) and is incident on first optical surface 412 of optical waveguide 410. The light (e.g., rays 430 and 434) is reflected at first optical surface 412 of optical waveguide 410 via total internal reflection and is incident on the one or more output couplers 418. The one or more output couplers 418 redirect at least a portion of the light such that the redirected portion of the light is incident on first optical surface 412 of optical waveguide 410 at an angle that does not meet total internal reflection conditions (e.g., the angle is less than a critical angle). The redirected portion of the light exits optical waveguide 410 and is directed toward eyebox 420 and/or pupil 350 of the eye 340 of the user.

In FIG. 5A, optical device 500 is configured to direct light from a light projector (e.g., light projector 422) such that the exit angle of the light correspond to the input angle of the light. In some embodiments, the input angle and the exit angle are the same (e.g., exit angle 450-2 and input angle 450-1 are identical, and exit angle 454-2 and input angle 454-1 are identical). For example, ray 430 enters prism 440 at input angle 450-1 and exits optical waveguide 410 at exit angle 450-2. Similarly, ray 434 enters prism 440 at input angle 454-1 and exits optical waveguide 410 at exit angle 454-2. The input angle (e.g., angles 450-1 and 454-1) defines an input angular spread. The exit angle (e.g., angles 450-2 and 454-2) defines an exit angular spread. In some embodiments, the exit angular spread corresponds to the input angular spread. In some embodiments, the exit angular spread is the same as the input angular spread.

As shown in FIG. 5A, optical device 500 is capable of directing light with large input angles (e.g., ray 434 entering prism 440 at input angle 454-1) to the eyebox (e.g., eyebox 420) and/or the pupil 350 of the eye 340 of the user. Thus, optical device 500 has a larger FOV than optical device 400. As explained above, the large FOV of optical device 500 can be achieved by tilting light projector 422 such that a principal direction of light from light projector 422 is non-perpendicular to slanted facet 416 of optical waveguide 410. However, this leads to dispersion when coupling light output from light projector 422 into optical waveguide 410 through slanted facet 416. Prism 440 is used in optical device 500 as an input coupler in order to prevent or reduce dispersion and smearing of an image displayed by the light. In some cases, as shown in FIG. 5A, first optical surface 442 of prism 440 is substantially perpendicular to the principal direction of light from light projector 422 (e.g., a surface normal to first optical surface 442 of prism 440 and an axial ray from light projector 422 form an angle less than 1 arcminute). In some cases, as shown in FIG. 5A, first optical surface 442 of prism 440 is perpendicular to the principal direction of light from light projector 422. In some cases, second optical surface 444 of prism 440 is substantially parallel to first optical surface of 412 of optical waveguide 410. In some cases, second optical surface 444 of prism 440 is parallel to first optical surface of 412 of optical waveguide 410. In some embodiments, dispersion of light that is coupled from light projector 422 into optical waveguide 410 via prism 440 compensates for dispersion of the light upon exiting from optical waveguide 410. In some embodiments, the compensation of dispersion prevents or reduces smearing of the one or more images. In some embodiments, dispersion of light coupled from light projector 422 into optical waveguide 410 via prism 440 is reduced compared to light coupled from light projector 422 into optical waveguide 410 without prism 440.

In accordance with some embodiments, optical device (e.g., optical device 500) includes an optical waveguide (e.g., optical waveguide 410) that has a first optical surface (e.g., optical surface 412) and a second optical surface (e.g., optical surface 414) opposite to the first optical surface. Both the first optical surface and the second optical surface extend from a first end (e.g., end 415) of optical waveguide to a second end (e.g., end 417) of the optical waveguide that is opposite to first end of the optical waveguide. The optical waveguide also has a slanted facet (e.g., facet 416) adjacent to the first end of the optical waveguide. The slanted facet is non-parallel and non-perpendicular to the first optical surface and the second optical surface. The optical device also includes a reflector (e.g., reflector 413) on the slanted facet of the optical waveguide and a prism (e.g., prism 440) located adjacent to the first end of the optical waveguide and separate from the optical waveguide (e.g., light transmitted through the prism and entering the optical waveguide impinges on the slanted facet without reflection on the second optical surface). In some embodiments, the prism is located adjacent to the first optical surface of the optical waveguide.

In some embodiments, one or more output couplers (e.g., one or more output couplers 418) are located adjacent to the second optical surface of the optical waveguide (e.g. second optical surface 414 of optical waveguide 410). In some cases, as shown in FIG. 5A, the one or more output couplers 418 are located within optical waveguide 410. In some cases, the one or more output couplers 418 may be located outside optical waveguide 410 and adjacent to second optical surface 414. When the one or more output couplers 418 are located outside optical waveguide 410, first surface 490 of the one or more output couplers 418 and second surface 492 of the one or more output couplers 418 are substantially parallel to first optical surface 412 of optical waveguide 410 and second optical surface 414 of optical waveguide 410 (e.g., first surface 490 and/or second surface 492 of the one or more output couplers 418 form an angle with first optical surface 412 and/or second optical surface 414 of optical waveguide 410 that is less than 1 arcminute).

In some embodiments, the prism (e.g., prism 440) includes a first optical surface (e.g., optical surface 442) and a second optical surface (e.g., second optical surface 444). The prism is configured to receive, through the first optical surface of the prism, light from a light projector (e.g., light projector 422) in a first direction and steer the light from the light projector toward an optical waveguide (e.g., optical waveguide 410) in a second direction that is non-parallel to the first direction (e.g., the direction of ray 430 before entering prism 440 is different from the direction of ray 430 after exiting from prism 440, and the direction of ray 434 before entering prism 440 is different from the direction of ray 434 after exiting from prism 440). The optical waveguide is configured to receive, through the first optical surface of the optical waveguide, the light from the prism in the second direction that is non-perpendicular to the first optical surface of the optical waveguide and steer, at the first optical surface of the optical waveguide, the light toward the slanted facet 416 in a third direction that is non-parallel to the second direction (e.g., ray 430 is refracted at first optical surface 412 of optical waveguide so that the direction of ray 430 before entering optical waveguide 410 is different from the direction of ray 430 after entering optical waveguide 410, and ray 434 is refracted at first optical surface 412 of optical waveguide so that the direction of ray 434 before entering optical waveguide 410 is different from the direction of ray 434 after entering optical waveguide 410). The reflector (e.g., reflector 413) on the slanted facet (e.g., facet 416) is configured to reflect the light steered, at first optical surface of optical waveguide, in a fourth direction for propagation within optical waveguide 410 (e.g., reflector 413 reflects ray 430 so that ray 430 propagates in a direction different from the direction of ray 430 before the reflection). The one or more output couplers (e.g., one or more output couplers 418) are configured to redirect at least a portion of the light impinging on the one or more output couplers for transmission out of the optical waveguide through the first optical surface of the optical waveguide (e.g., one or more output couplers 418 redirect ray 430 into a direction so that ray 430 is not reflected by first optical surface 412 of optical waveguide 410 via total internal reflection and ray 430 exits from optical waveguide 410 through first optical surface 412 of optical waveguide 410).

In some embodiments, light projector 422 is configured to output light along its optical axis 426. In some embodiments, the optical axis 426 of the light output by light projector 422 is substantially perpendicular to first optical surface 442 of prism 440 (e.g., the light projected by light projector 422 and first optical surface 442 of prism 440 form an angle that is less than 1 arcminute). In some embodiments, the direction of the light output by light projector 422 is non-parallel to first optical surface 412 of optical waveguide 410.

In some embodiments, a principal direction of the light output by light projector 422 is along the optical axis 426 of light projector 422 and substantially perpendicular to first optical surface 442 of prism 440 (e.g., the principal direction of the light output by light projector 422 and a surface normal to first optical surface 442 of prism 440 form an angle that is less than 1 arcminute).

In some embodiments, the light (e.g., rays 430 and 434) from the light projector impinges on the first optical surface of the prism at a zero angle of incidence (e.g., a principal direction of the light from light projector 422 has a zero angle of incidence on first optical surface 442 of prism 440). The light (e.g., rays 430 and 434) is redirected (e.g., after propagation within optical waveguide 410) by the one or more output couplers and impinges on the first optical surface of the optical waveguide at a zero angle of incidence (e.g., a principal direction of the light redirected by the one or more output couplers 418 has a zero angle of incidence on first optical surface 412 of optical waveguide 410).

FIG. 5B shows further propagation of ray 430 in optical device 500. Some of the features illustrated in FIG. 5A are omitted in FIG. 5B so as not to obscure other aspects of optical device 500 and its operations. In FIG. 5B, ray 430 is coupled into optical waveguide 410 as described above with respect to FIG. 5A. Ray 430 is incident upon the one or more output couplers 418. The one or more output couplers 418 redirect at least a portion of ray 430 (e.g., ray 430-A) in a first direction, toward first optical surface 412 of optical waveguide 410. Ray 430-A exits optical waveguide 410 at a first location 462-A on first optical surface 412 at exit angle 450-2. Ray 430-A is directed to eyebox 420. In FIG. 5B, ray 430-A is not directed to the pupil 350 of the eye 340 of the user.

A remaining portion of ray 430 (e.g., ray 430-B) that is not redirected by the one or more output couplers 418 as ray 430-A is reflected toward first optical surface 412 (e.g., by second optical surface 414 of optical waveguide 410 via total internal reflection or by the one or more output couplers 418) and is subsequently reflected by first optical surface 412 via total internal reflection. In some cases, a portion of ray 430-B is redirected in a second direction, by the one or more output couplers 418, toward first optical surface 412 instead of being reflected by second optical surface 414 of optical waveguide 410 via total internal reflection. The one or more output couplers 418 redirect a portion of ray 430-B (e.g., ray 430-C) in the first direction, toward first optical surface 412 of optical waveguide 410. Ray 430-C exits optical waveguide 410 at a second location 462-C on first optical surface 412 at exit angle 450-3. In FIG. 5B, ray 430-C is directed to the eyebox 420 and to the pupil 350 of the eye 340 of the user.

In some embodiments, the one or more output couplers 418 are configured to redirect light propagating within the optical waveguide from the first end of the optical waveguide toward the second end of the optical waveguide so that a first portion of the light is transmitted out of the optical waveguide through a first location of the first optical surface of the optical waveguide and a second portion of the light, distinct from the first portion of the light, is transmitted out of the optical waveguide through a second location of the first optical surface of the optical waveguide that is distinct and separate from the first location of the first optical surface of optical waveguide (e.g., the one or more output couplers 418 redirect ray 430 from the first end 415 of optical waveguide 410 to the second end 417 of optical waveguide 410. Ray 430-A exits optical waveguide 410 through location 462-A and ray 430-C exits optical waveguide 410 at location 462-C.).

Although the one or more output couplers 418 shown in FIGS. 5A and 5B are a single contiguous output coupler, two or more distinct and separate output couplers may be used instead of a single contiguous output coupler. For example, in some embodiments, a distinct and separate output coupler is located at a respective location on second optical surface 414 where light is to be redirected.

In some embodiments, the one or more output couplers 418 include a volume Bragg grating. Ray 430 is coupled into optical waveguide 410 as described above with respect to optical device 500. Ray 430, after reflection at first optical surface 412, is incident upon the volume Bragg grating. The volume Bragg grating redirects a portion of ray 430 (e.g., ray 430-A) in a first direction toward first optical surface 412 of optical waveguide 410 (e.g., by diffraction, such as a first order diffraction) so that ray 430-A exits optical waveguide 410 at a first location 462-A on first optical surface 412 at exit angle 450-2.

The portion of ray 430 that is not redirected in the first direction (e.g., ray 430-B) is redirected by the volume Bragg grating in a second direction, distinct from the first direction, toward first optical surface 412 of optical waveguide 410 (e.g., by diffraction, such as a zeroth order diffraction). Ray 430-B is reflected by first optical surface 412 via total internal reflection toward the volume Bragg grating. The volume Bragg grating redirects a portion of ray 430-B (e.g., ray 430-C) in the first direction toward first optical surface 412 of optical waveguide 410 (e.g., by diffraction, such as a first order diffraction) so that ray 430-C exits optical waveguide 410 at a second location 462-C on first optical surface 412 at exit angle 450-3.

In some embodiments, the volume Bragg grating includes two or more gratings. For example, the volume Bragg grating shown may be split into two or more separate gratings. For example, a first grating is located to redirect at least a portion of ray 430 (e.g., by diffraction, such as a first order diffraction) toward first location 462-A and a second grating is located to redirect at least a portion of ray 430-B (e.g., by diffraction, such as the first order diffraction) toward second location 462-C. The second grating is separated from the first grating. In some embodiments, the first grating is configured to redirect at least a portion of incident light having a first wavelength range and the second grating is configured to redirect at least a portion of incident light having a second wavelength range.

In some embodiments, the one or more output couplers include a volume Bragg grating. The volume Bragg grating is configured to direct respective portions of light propagating within the optical waveguide from the first end of the optical waveguide toward the second end of the optical waveguide so that a respective portion of the plurality of the light is transmitted out of the optical waveguide through a corresponding location of the first optical surface of the optical waveguide (e.g., the volume Bragg grating directs ray 430, including rays 430-A, 430-B, and 430-C, so that ray 430-A is transmitted out of optical waveguide 410 through location 462-A and ray 430-C is transmitted out of optical waveguide 410 through location 462-C).

In some embodiments, the light received by the prism (e.g., prism 440) has a first angular spread (e.g., input angular spread). At least the portion of the light transmitted through first the optical surface of the optical waveguide (e.g., light that has been transmitted out of optical waveguide 410 through first optical surface 412 of optical waveguide 410) has a second angular spread (e.g., exit angular spread). The first optical surface (e.g., optical surface 442) of the prism (e.g. prism 440) and the second optical surface (e.g., optical surface 444) of the prism form an acute angle (e.g., angle 590, shown in FIG. 5A). The slanted facet (e.g., facet 416) defines a facet angle (e.g., angle 411) with respect to the first optical surface of the optical waveguide. The facet angle (e.g., angle 411) and the acute angle (e.g., 590) of the prism are selected so that any light within the first angular spread is output through the first optical surface (e.g., optical surface 412) of the optical waveguide (e.g., optical waveguide 410) within the second angular spread that corresponds to the first angular spread.

In some embodiments, the first angular spread (e.g., input angular spread) and the second angular spread (e.g., exit angular spread) are 60 degrees or greater. In some embodiments, the facet angle 411 is between 35 degrees and 45 degrees. In some embodiments, facet angle 411 is between 30 degrees and 65 degrees. The second angular spread (e.g., exit angular spread) corresponds to a FOV of the device.

FIG. 5C illustrates optical device 501, which is similar to optical device 500 except that the one or more output couplers 418 of optical device 501 include a plurality of reflectors (e.g., 419-A, 419-B). Ray 430 is coupled into optical waveguide 410 as described above with respect to optical device 500. Ray 430 is incident upon reflector 419-A of the plurality of reflectors. Reflector 419-A reflects a portion of ray 430 (e.g., ray 430-A) toward first optical surface 412 of optical waveguide 410. Ray 430-A exits optical waveguide 410 at a first location 462-A on first optical surface 412 at exit angle 450-2. In FIG. 5C, ray 430-A is directed to the eyebox 420 but is not directed to the pupil 350 of the eye 340 of the user.

Ray 430-B is directed toward first optical surface 412 into a direction that is different from the direction of ray 430-A in optical waveguide 410. Ray 430-B is subsequently reflected by first optical surface 412 via total internal reflection toward reflector 419-B. Reflector 419-B reflects a portion of ray 430-B (e.g., ray 430-C) toward first optical surface 412 of optical waveguide 410. Ray 430-C exits optical waveguide 410 at a second location 462-C on first optical surface 412 at exit angle 450-3. In FIG. 5C, ray 430-C is directed to the eyebox 420 and to the pupil 350 of the eye 340 of the user. A portion of ray 430-B is directed toward first optical surface 412 into a direction that is different from the direction of ray 430-C in optical waveguide 410.

In some embodiments, the one or more output couplers include a plurality of reflectors. A respective reflector of the plurality of reflectors is configured to reflect a respective portion of light propagating within the optical waveguide from the first end of the optical waveguide toward the second end of the optical waveguide so that the respective portion of the light is transmitted out of the optical waveguide through a corresponding location of the first optical surface of the optical waveguide (e.g., reflector 419-A reflects a portion of ray 430, namely ray 430-A, so that ray 430-A exits from optical waveguide 410 through location 462-A on first optical surface 412 of optical waveguide 410 and reflector 419-C reflects a portion of ray 430-B, namely ray 430-C, so that ray 430-C exits from optical waveguide 410 through location 462-C on first optical surface 412 of optical waveguide 410).

In some embodiments, the respective portions of the light are transmitted out of optical waveguide 410 at the same angle (e.g., for rays 430-A and 430-C, angles 450-2 and 450-3 are the same).

In some embodiments, a respective reflector (e.g., reflectors 419-A and 419-B) of the plurality of reflectors is embedded in optical waveguide 410. In some embodiments, a respective reflector of the plurality of reflectors (e.g., reflectors 419-A and 419-B) is non-parallel and non-perpendicular to second optical surface 414 of optical waveguide 410. In some embodiments, a respective reflector of the plurality of reflectors is a partial reflector that reflects a first portion of light incident on a first reflector and transmits a second portion of light incident on a second reflector (e.g., reflector 419-A reflects a portion of ray 430, namely ray 430-A, and transmits a remaining portion of ray 430, namely ray 430-B, which is, in turn, reflected by second optical surface 414 via total internal reflection).

FIGS. 5A-5C show that optical devices 500 and 501 utilize a prism (e.g., prism 440) for in-coupling light into an optical waveguide. As shown in FIG. 5A, optical devices 500 and 501 are capable of directing light with large input angles (e.g., ray 434 entering prism 440 at input angle 454-1) from the light projector (e.g., light projector 422) to the eyebox (e.g., eyebox 420) and/or the pupil 350 of the eye 340 of the user. Thus, optical devices 500 and 501 have a larger FOV than optical device 400.

In some embodiments, the prism includes a first optical surface (e.g., optical surface 442) and a second optical surface (e.g., optical surface 444). The second optical surface of the prism is optically coupled with the first optical surface of the optical waveguide (e.g., second optical surface 444 of prism 440 is positioned toward first optical surface 412 of optical waveguide 410 so that light exiting from second optical surface 444 of prism 440 impinges on first optical surface 412 of optical waveguide 410).

In some embodiments, the prism is located closer to the first optical surface of the optical waveguide than to the slanted facet of the optical waveguide (e.g., light exiting from second optical surface 444 of prism 440 does not impinge on slanted facet 416 of optical waveguide 410 before impinging on first optical surface 412 of optical waveguide 410).

In some embodiments, the second optical surface of the prism is positioned parallel to the first optical surface of the optical waveguide (e.g., second optical surface 444 and first optical surface 412 form an angle less than 1 arcminute). The second optical surface of the prism is separated from the first optical surface of the optical waveguide (e.g., by air).

In some embodiments, the second optical surface of the prism (e.g., second optical surface 444 of prism 440) is separated from the first optical surface of the optical waveguide (e.g., first optical surface 412 of optical waveguide 410) by a distance (e.g., distance 460). In some embodiments, the distance (e.g., distance 460) is 500 nanometers of more. In some embodiments, the distance (e.g., distance 460) is 400 nanometers or more. In some embodiments, distance 460 is between 400 nanometers and 600 nanometers.

In some embodiments, the optical axis 426 of the light projector is substantially perpendicular to the first optical surface of the prism (e.g., the optical axis 426 of the light projector and first optical surface 412 form an angle less 1 arcminute).

In some embodiments, the optical device (e.g., optical devices 500 and 501) is substantially transparent to visible light (e.g., 480 nanometers to 750 nanometers). In some embodiments, the optical device (e.g., optical devices 500 and 501) transmits at least 95%, 90%, 85%, 80%, 75%, 50%, 65%, 60%, 55%, 50%, 45%, 40%, 35%, 30%, 25% of visible light.

In some embodiments, the light received by the prism is non-monochromatic. In some embodiments, the light includes RGB wavelengths (e.g., 635-680 nm, 520-560 nm, and 450-490 nm). In some embodiments, the light projector is a display (e.g., LCoS, DLP, or MEMS scanner) including one or more light sources (e.g., LEDs, microLEDs, or SLEDs).

Figure 6B:
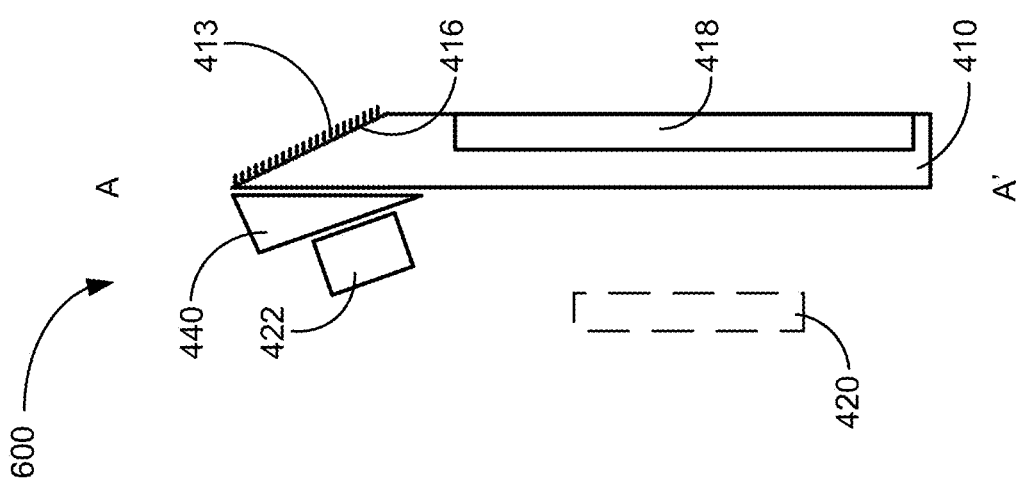
FIG. 6B illustrates a cross-section of the two-dimensional optical device shown in FIG. 6A.
Figure 6A:
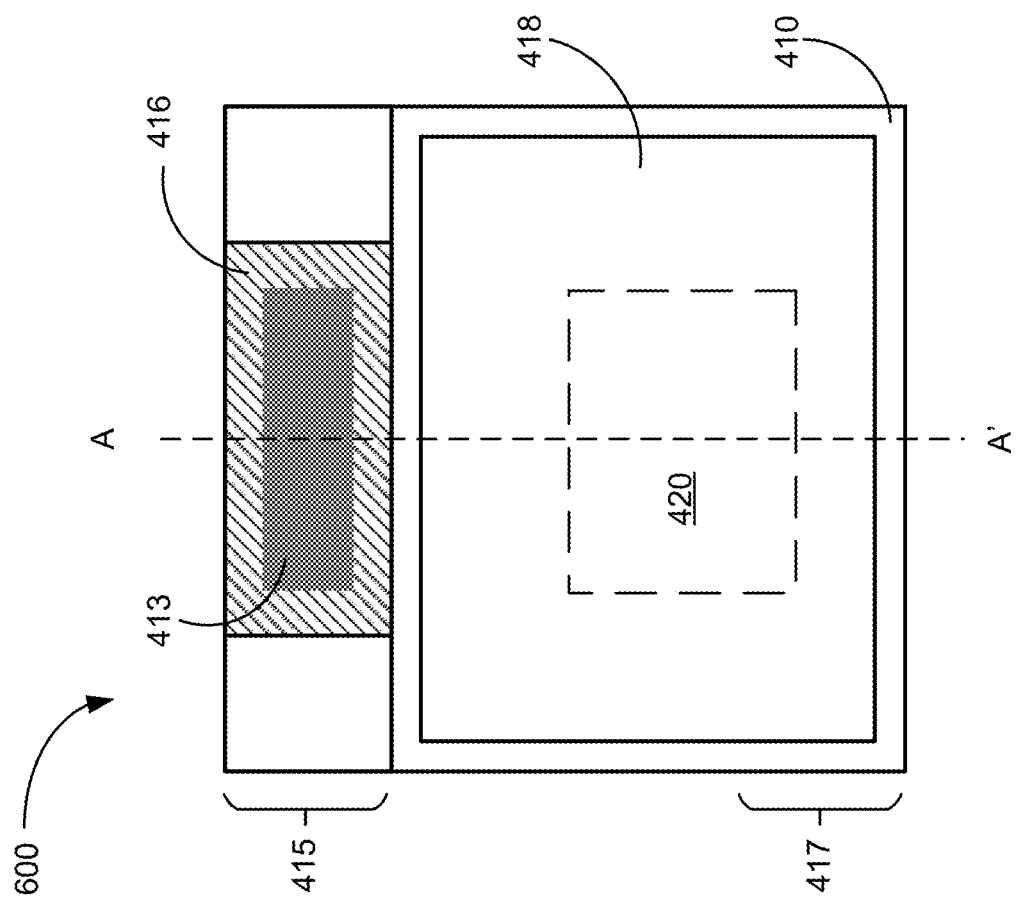
FIG. 6A illustrates a two-dimensional optical device in accordance with some embodiments.
Figure 6C:
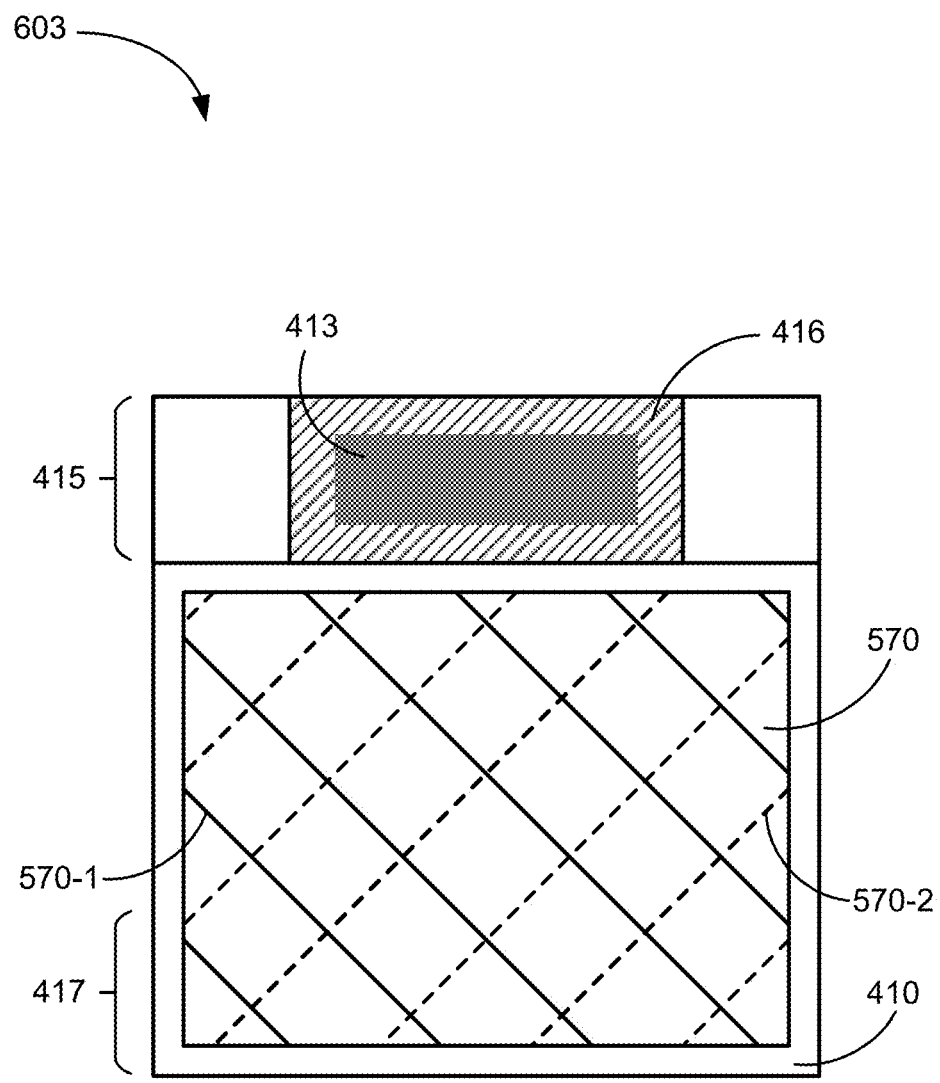
FIG. 6C illustrates a two-dimensional optical device in accordance with some embodiments.

FIGS. 6A and 6C illustrate a two-dimensional optical device in accordance with some embodiments. FIG. 6B illustrates a cross-section of the two-dimensional optical device shown in FIG. 6A.

FIG. 6A illustrates that optical devices 500 and 501 shown in FIGS. 5A-5C can be implemented as two-dimensional optical devices (e.g., optical device 600). Two-dimensional optical device 600 is configured to direct light from a light projector to eyebox 420 encompassing a two-dimensional area. In FIG. 6A, optical device 600 includes slanted facet 416, reflector 413 on slanted facet 416, optical waveguide 410, and the one or more output couplers 418. Also shown in FIG. 6A is eyebox 420. A cross-sectional view of the two-dimensional optical device shown in FIG. 6A, taken along AA', is shown in FIG. 6B.

FIG. 6C illustrates that a two-dimensional optical device 603, which is similar to optical device 600 except that the one or more output couplers 418 of two-dimensional optical device 603 includes a volume Bragg grating 570 that operates as a combination of one or more gratings (e.g., gratings 570-1 and 570-2).

For example, two gratings (e.g., 570-1 and 570-2) are shown in FIG. 6C. Grating 570-1 is skewed from grating 570-2 (e.g., a grating vector of grating 570-1 is non-parallel to a grating vector of grating 570-2). In some embodiments, gratings 570-1 and 570-2 are formed by recording grating patterns in a recordable medium (e.g., a holographic medium). In some embodiments, both grating 570-1 and grating 570-2 are recorded in a same recordable medium. In FIG. 6C, grating 570-1 is configured to redirect at least a portion of incident light toward a first direction (e.g., by diffraction, such as a first order diffraction of a first grating)

and grating 570-2 is configured to redirect at least a portion of incident light toward a second direction that is distinct from the first direction (e.g., by diffraction, such as a first order diffraction of a second grating). By having two gratings that are oriented non-parallel to each other, light is distributed in two dimensions. In some embodiments, grating 570-1 is configured to redirect at least a portion of incident light having the first wavelength range and grating 570-2 is configured to redirect at least a portion of incident light having the second wavelength range.

Figure 7:
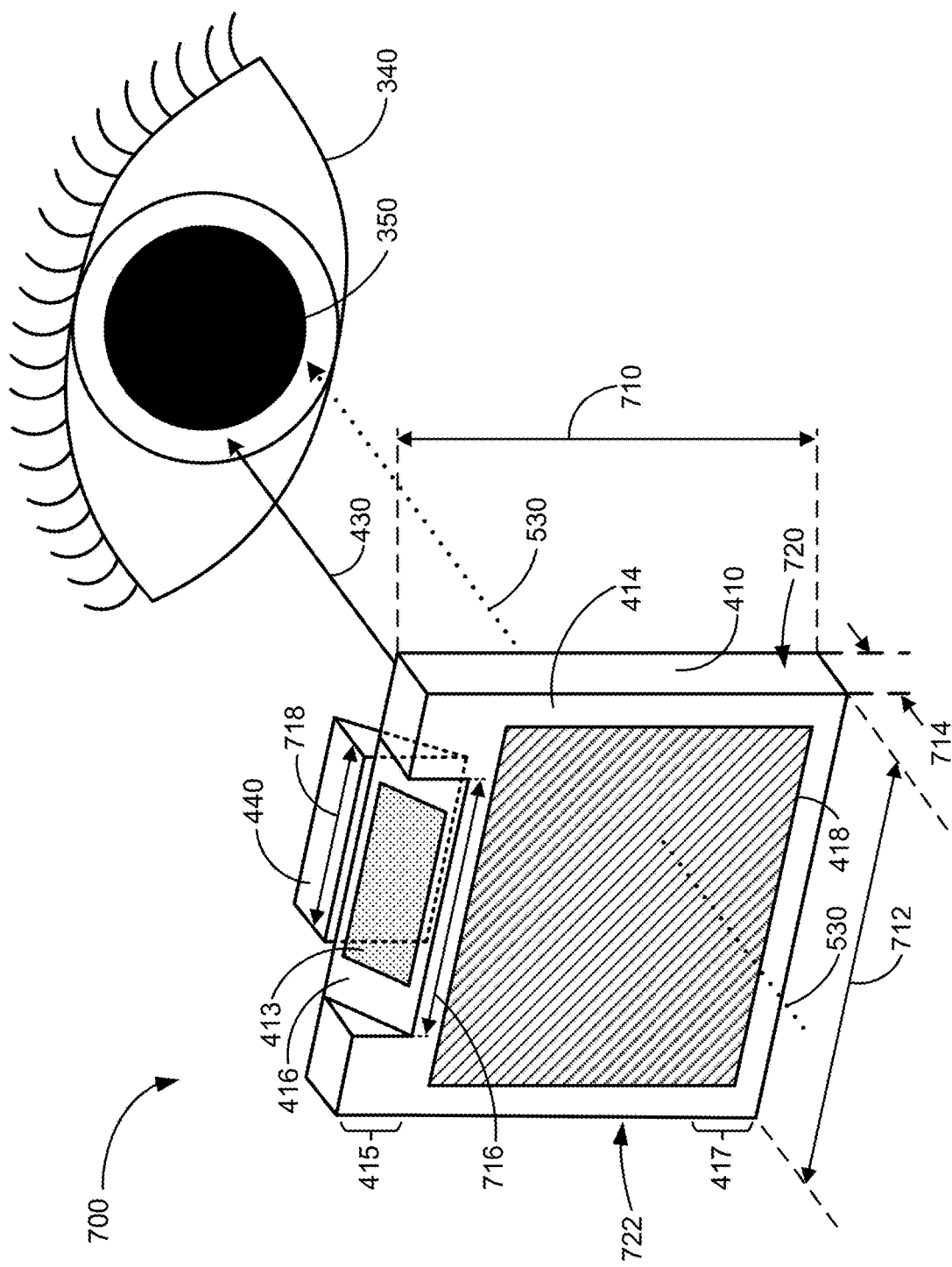
FIG. 7 is an isometric view of a display device in accordance with some embodiments.

FIG. 7 is an isometric view of a display device 700 in accordance with some embodiments. Display device 700 includes an optical device as described above (e.g., optical device 500 or 501).

In some embodiments, the optical waveguide (e.g., optical waveguide 410) has a length (e.g. length 710) of at least 8 mm and a width (e.g., width 712, distance between side surfaces 720 and 722) of at least 8 mm. In some embodiments, the optical waveguide has a length of at least 20 mm. In some embodiments, the optical waveguide has a width of at least 20 mm. In some embodiments, the optical waveguide has a length of at least 30 mm. In some embodiments, the optical waveguide has a width of at least 30 mm. In some embodiments, the optical waveguide has a length of at least 40 mm. In some embodiments, the optical waveguide has a width of at least 40 mm. In some embodiments, the optical waveguide has a length of at least 50 mm. In some embodiments, the optical waveguide has a width of at least 50 mm. In some embodiments, the optical waveguide has a length between 40 mm and 50 mm. In some embodiments, the optical waveguide has a width between 40 mm and 50 mm. In some embodiments, the optical waveguide has a thickness (e.g., thickness 714, distance between first optical surface 412 and second optical surface 414) between 1 mm and 2 mm.

In some embodiments, the prism has a length that is less than the width of optical waveguide 410 (e.g., length 718 of prism 440 is less than width 712 of optical waveguide 410 as shown in FIG. 7). This allows the display device to project images from a small light projector over a large area, thereby allowing the display device to project the images into a pupil even if the pupil moves around laterally within the eyebox.

In some embodiments, as shown in FIG. 7, the slanted facet has a width that is less than the width of optical waveguide (e.g., width 716 of facet 416 is narrower than the full width 712 of optical waveguide 410, as shown in FIG. 7). In some embodiments, the width of the slanted facet is the same as the width of the optical waveguide 410 (e.g., facet 416 extends along the entire width of optical waveguide 410, width 716 and width 712 are the same).

In some embodiments, the facet 416 and the prism 440 may be disposed centered relative to side surfaces 720 and 722 so that the facet 416 is equidistant from each of the side surfaces 720 and 722 and the prism 440 is also is equidistant from each of the side surfaces 720 and 722.

In some embodiments, the facet 416 and the prism 440 may be disposed off-centered relative to side surfaces 720 and 722 so that the facet 416 and the prism 440 are located closer to one side of the waveguide 410 than the other side (e.g., facet 416 and prism 440 are located closer to side surface 720 than to side surface 722, or vice versa).

In some embodiments, the waveguide 410 is coupled to two or more prisms. For example, the waveguide 410 may be coupled to a first prism that is disposed closer to side surface 720 than to side surface 722 of the waveguide 410. The waveguide 410 may also be coupled to a second prism, distinct from the first prism, that is disposed closer to side surface 722 than to side surface 720 of the waveguide 410. At least in such cases, the width of the slanted facet 416 may be the same as the width of the optical waveguide 410 (e.g., facet 416 extends along the entire width of optical waveguide 410 from side surface 720 to side surface 722 so that width 716 and width 712 are the same). Alternatively, the waveguide may include two distinct slanted facets that are disposed on the first end 415 of the waveguide for coupling with the two prisms. For example, a first slanted facet may be configured to receive light from the first prism (located closer to side surface 720) and is therefore disposed closer to side surface 720 than to side surface 722 of the waveguide 410, and a second slanted facet may be configured to receive light from the second prism (located closer to side surface 722) and is therefore disposed closer to side surface 722 than to side surface 720 of the waveguide 410.

In some embodiments, at least a portion of the slanted facet (e.g., facet 416) is not covered with a reflective material (e.g., reflector 413). In some embodiments, the entire slanted facet (e.g., facet 416) is covered with a reflective material (e.g., reflector 413).

In some embodiments, at least a portion of the slanted facet (e.g., facet 416) is coated with an anti-reflective coating to reduce back-reflection of input light.

In accordance with some embodiments, a display device 700 includes a light projector (e.g., light projector 422) and an optical device (e.g., optical devices 500 and 501).

In some embodiments, the light projector (e.g., light projector 422) is configured to project light that corresponds to one or more images. The display device (e.g., display device 700) is configured to combine the light projected from the light projector (e.g., ray 430) and light from an outside of the display device (e.g., ray 530) for providing an overlap of the one or more displayed images, projected from the light projector, and a real image that corresponds to the light from the outside of the display device.

In some embodiments, the display device (e.g., display device 700) is configured to expand the one or more images projected by the light projector (e.g., light projector 422) to an eyebox (e.g. eyebox 420) that is larger than the one or more images on the light projector.

Figure 8:
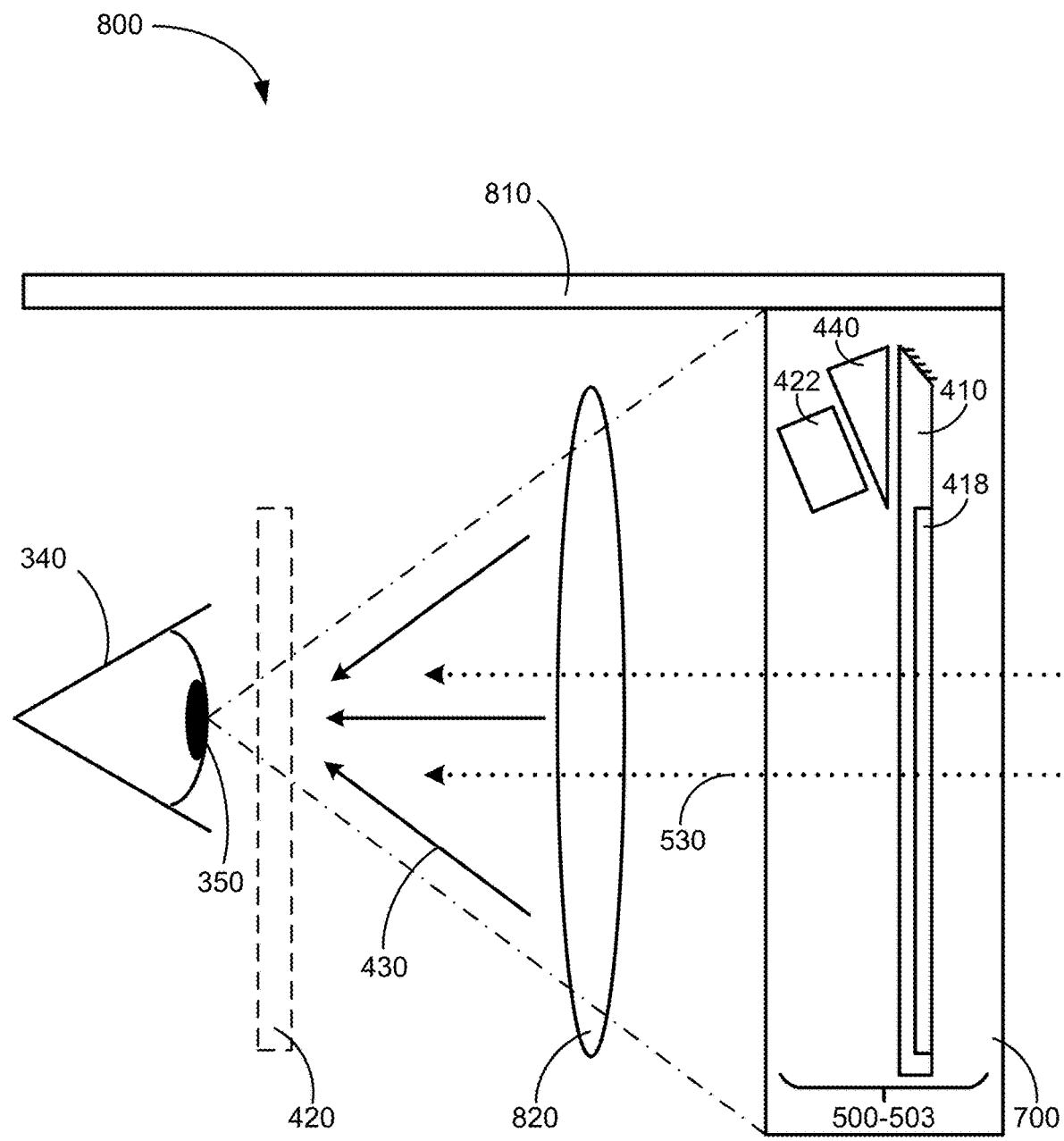
FIG. 8 illustrates a head-mounted display device in accordance with some embodiments.

FIG. 8 illustrates a head-mounted display device in accordance with some embodiments.

In some embodiments, the display device (e.g., display device 800) is a head-mounted display device.

As shown in FIG. 8, display device 700 shown in FIG. 7 can be implemented as a head-mounted display device (e.g., head-mounted display device 800).

Head-mounted display device 800 includes display device 700 (which includes one of optical devices 500 and 501). In some embodiments, head-mounted display device 800 includes one or more lenses 820, and head-mounted display device 800 is configured to direct light from display device 700 (e.g., rays 430), through one or more lenses 820, to eyebox 420 and/or the pupil 350 of the eye 340 of the user. In some embodiments, head-mounted display device 800 also includes frame 810, configured to mount head-mounted display device 800 on a head of the user.

Figure 9A:
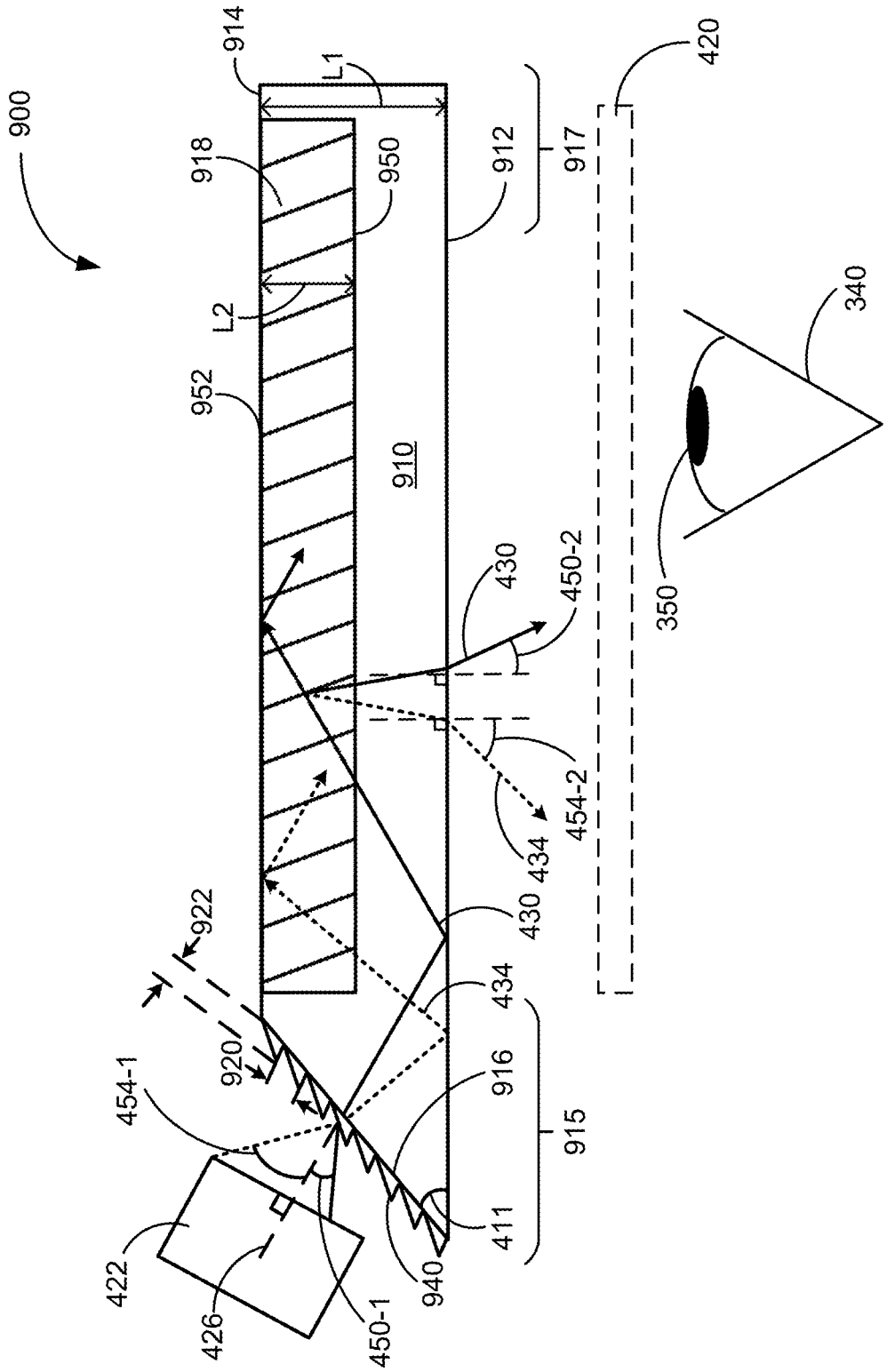
FIGS. 9A-9C illustrate an optical device in accordance with some embodiments.
Figure 9B:
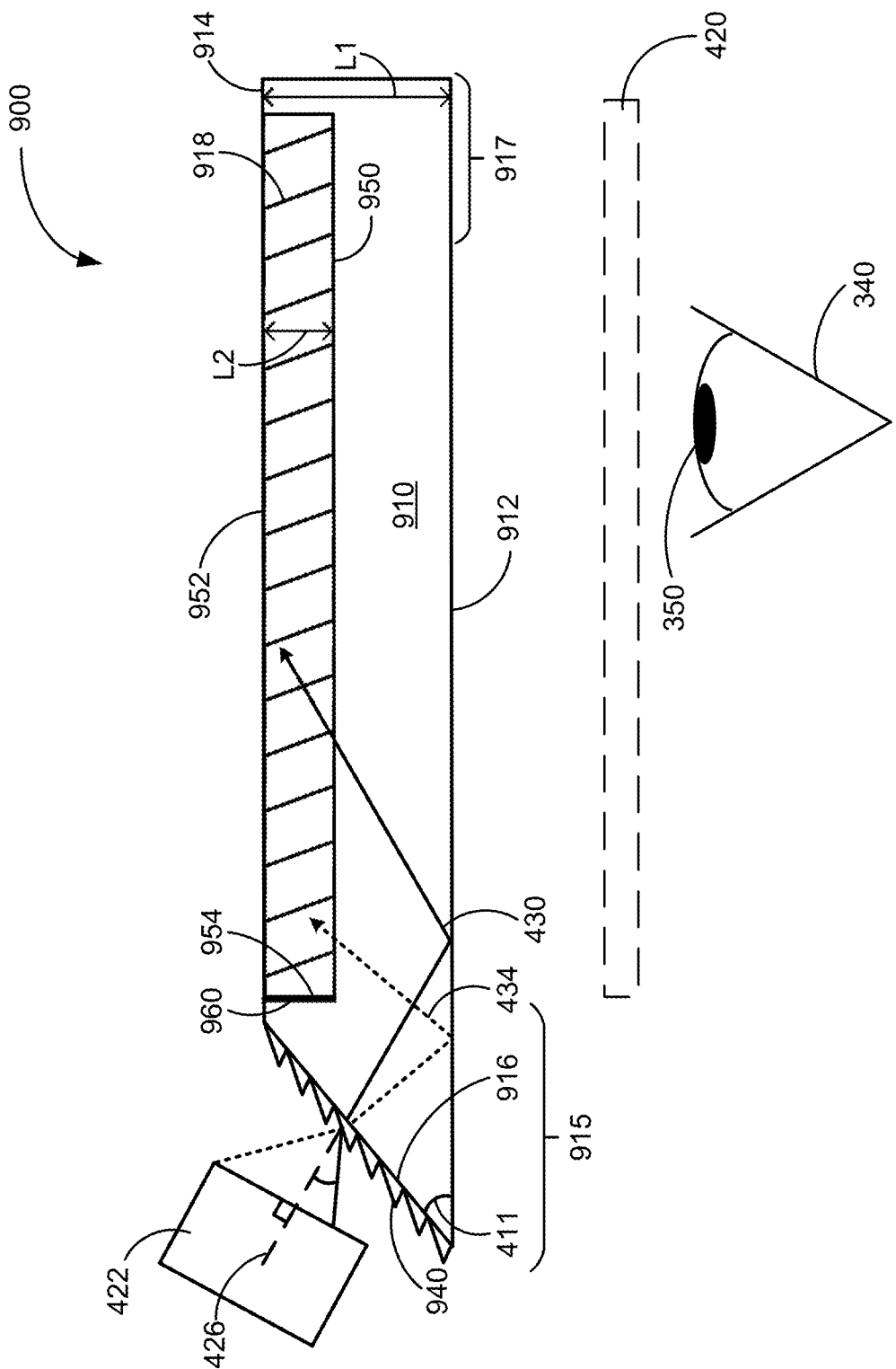
Figure 9C:
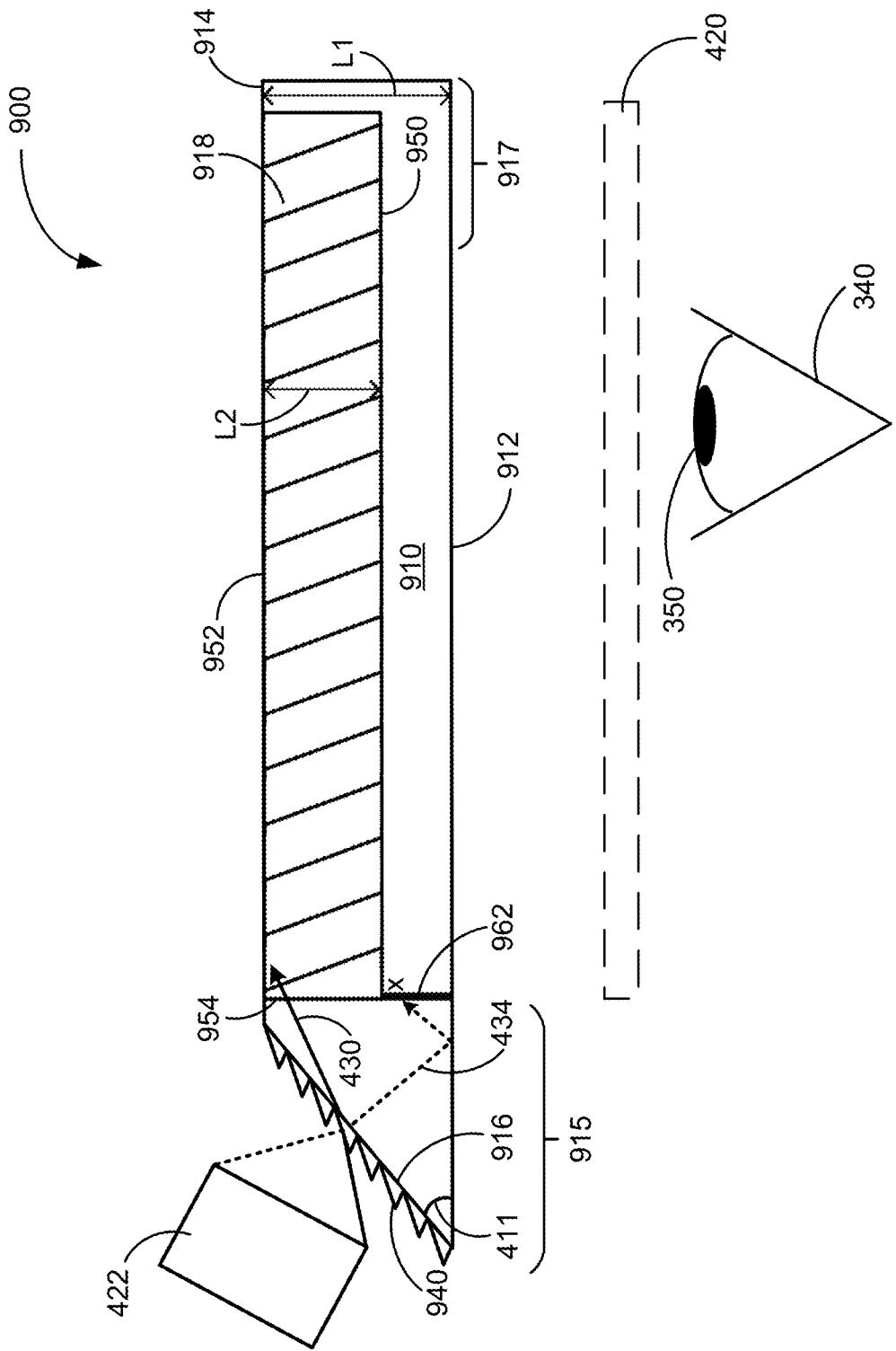

FIGS. 9A-9C illustrate an optical waveguide 900 in accordance with some embodiments. Optical device 900 is configured to direct light from a light projector, (e.g., light projector 422) such that an exit angle of the light corresponds to an input angle of the light. As shown in FIG. 9A, optical device 900 includes optical waveguide 910. Optical waveguide 910 has a first optical surface 912 and a second optical surface 914 that is separated from the first optical surface 912 by a distance L1 (corresponding to a thickness 714 of the waveguide 910). In some embodiments, second optical surface 914 is substantially parallel to first optical surface 912 (e.g., second optical surface 914 and first optical surface 912 form an angle less than 1 arcminute). In some embodiments, second optical surface 914 is parallel to first optical surface 912. Optical waveguide 910 has two ends 915 and 917. First end 915 has a slanted facet 916 that is non-perpendicular and non-parallel to first optical surface 912 and second optical surface 914. Slanted facet 916 includes grating 940. Second end 917 may or may not have a slanted facet (e.g., in some cases, second end 917 has a facet that is perpendicular to first optical surface 912 and second optical surface 914). Optical waveguide 910 also includes one or more output couplers 918 that are located along second optical surface 914. Optical waveguide 910 is configured to receive light from a light projector 422. Rays 430 and 434 are output by light projector 422 and received by slanted facet 916 of optical waveguide 10. Rays 430 and 434 are coupled into (e.g., enter) optical waveguide 910 through grating 940 at slanted facet 916.

Ray 430 enters optical waveguide 410 at input angle 450-1. Ray 434 enters optical waveguide 410 at input angle 454-1. Input angle 454-1 of ray 434 is larger than input angle 450-1 of ray 430. Rays 430 and 434 enter optical waveguide 410 through slanted facet 916 and are steered by grating 940 at slanted facet 916 in a first direction toward first optical surface 912. Rays 430 and 434 are reflected at first optical surface 912 via total internal reflection and travel toward the one or more output couplers 918 and/or second optical surface 914. Rays 430 and 432 are incident on at least a portion of the one or more output couplers 918. The one or more output couplers 918 redirect at least a portion of ray 430 and at least a portion of ray 432. The portions of rays 430 and 432 that are redirected by the one or more output couplers 918 are incident on first optical surface 412 at an angle that does not meet the conditions for total internal reflection (e.g., the incident angle is less than the critical angle). Thus, the portions of rays 430 and 432 that are redirected by the one or more output couplers 918 exit optical waveguide 410 through first optical surface 412 and are directed to eyebox 420 and/or to the pupil 350 of the eye 340 of the user. The portion of ray 430 that is redirected to eyebox 420 (at least partially) exits optical waveguide 410 at exit angle 450-2, corresponding to input angle 450-1. The portion of ray 432 that is redirected to eyebox 420 exits optical waveguide 410 at exit angle 452-2, corresponding to input angle 452-1. In some embodiments, exit angle 450-2 is the same as input angle 450-1 and exit angle 452-2 is the same as input angle 452-1.

In accordance with some embodiments, an optical device (e.g., optical device 900) includes an optical waveguide (e.g., optical waveguide 910). The optical waveguide has a first optical surface (e.g., optical surface 912) and a second optical surface (e.g., optical surface 914) opposite to first optical surface. Both the first optical surface and the second optical surface extend from a first end (e.g., end 915) of the optical waveguide to a second end (e.g., end 917) of the optical waveguide that is opposite to the first end of optical waveguide. The optical waveguide also has a slanted facet (e.g., facet 916) adjacent to the first end of the optical waveguide. The slanted facet is non-parallel and non-perpendicular to the first optical surface and the second optical surface. The slanted facet includes a grating (e.g., grating 940). In some embodiments, grating features are engraved on the slanted facet 916. In some embodiments, the grating (e.g., grating 940) is coated with an anti-reflective coating to reduce back-reflection of input light. In some embodiments, the direction of light projected by light projector 422 is substantially parallel to slanted facet 916 of optical waveguide 910 (e.g., the optical axis of light projector 422 and slanted facet 916 form an angle less than less than 1 arcminute).

In some embodiments, the light projector (e.g., light projector 422) is tilted or non-parallel to the slanted facet (e.g., facet 916) of the optical waveguide (e.g., optical waveguide 910) in order to increase the FOV of the optical device (e.g., optical device 900), as described above. For example, the direction of light projected by the light projector and a surface normal to the slanted facet form an angle that is at least 10 degrees. In some embodiments, light projector 422 is tilted between 25 degrees and 30 degrees relative to a surface normal to the slanted facet 916 of optical waveguide 910. In some embodiments, light projector 422 is tilted between 20 degrees and 40 degrees relative to the surface normal to the slanted facet 916 of optical waveguide 910. As a result, a principal direction of light projected (e.g., by light projector 422 is non-orthogonal to slanted facet 916, which increases the FOV of the optical device (e.g., optical device 900). In such cases, dispersion of the projected light that is non-orthogonal to slanted facet 916 can lead to smearing of an image displayed by the light. As shown in FIG. 9A, a grating can be used to compensate for dispersion of the projected light. To compensate for dispersion, the grating steers the principal direction of light upon entering the optical waveguide so that the principal direction of light exiting the optical waveguide matches the principal direction of light entering the optical waveguide. For example, grating 940 steers light, entering optical waveguide 910 through slanted facet 916 at input angle 450-1, such that an input angular spread corresponds to an exit angular spread, which compensates for dispersion of the projected light. In some embodiments, the compensation for dispersion by the grating (e.g., grating 940) prevents or reduces smearing of the one or more images displayed by the light. In some embodiments, the incident light is steered to have a principal direction that is perpendicular to the slanted facet when the incident light is inside the optical waveguide (e.g., ray 430, coupled into optical waveguide 910 through slanted facet 916, is perpendicular to slanted facet 916 after entering optical waveguide 910) and the light exiting through the first optical surface of the optical waveguide is perpendicular to the first optical surface of the optical waveguide (e.g., ray 430, exiting optical waveguide 910 through first optical surface 912, is perpendicular to first optical surface 912).

In some embodiments, the grating (e.g., grating 940) is a blazed grating.

A grating period, Λ, (e.g., period 920, a pitch of the grating) can be determined based on the following equation:

$$\Lambda \sin(\beta'') = \frac{\Lambda}{n} \sin(\beta') - \frac{\lambda_0}{n}.$$

In this equation, $\beta'$ is the angle of incidence of light output from a light projector relative to the slanted facet (e.g., ray 430, output from light projector 422, enters optical waveguide 910 through slanted facet 916 at input angle 450-1, $\beta'$ is angle 450-1). The angle of ray 430, inside optical waveguide 910, refracted at slanted facet 916 is represented by $\beta''$. The center wavelength of the incident light (e.g., ray 430) is represented by $\lambda_0$, and the refractive index of the optical waveguide (e.g., optical waveguide 910) is represented by n. When the condition, $$\frac{d\beta''}{d\lambda_0} = 0,$$

is met (e.g., the refracted angle, $\beta''$, is independent of the center wavelength, $\lambda_0$), the grating period (e.g., period 920) is determined by the equation, $$\Lambda = \frac{\frac{n}{(dn/d\lambda_0)} + \lambda_0}{\sin(\beta)}.$$

In some embodiments, the grating period (e.g., period 920) is between 30 micrometers and 60 micrometers. A height of a blazed grating, d, (e.g., height 922 of grating 940) can be determined based on the equation.

$$d = \frac{\lambda_0}{(n-1)}.$$

In some embodiments, the height of the blazed grating (e.g., height 922) is approximately 1 micrometer.

In some embodiments, the one or more output couplers are located adjacent to the second optical surface (e.g., the one or more couplers 918 are located adjacent to second optical surface 914). In some cases, as shown in FIG. 9A, the one or more couplers 918 are located adjacent to second optical surface 914 and inside optical waveguide 910. Alternatively, the one or more output couplers 918 may be located outside optical waveguide 910 and adjacent to second optical surface 914. When the one or more output couplers 918 are outside optical waveguide 910, first surface 950 of the one or more output couplers 918 and second surface 952 of the one or more output couplers 918 are substantially parallel to first optical surface 912 of optical waveguide 910 and second optical surface 914 of optical waveguide 910 (e.g., first surface 950 and/or second surface 952 of the one or more output couplers 918 form an angle with first optical surface 912 and/or second optical surface 914 of optical waveguide 910 that is less than 1 arcminute).

The first surface 950 of the one or more output couplers 918 and second surface 952 of the one or more output couplers 918 are separated by a distance L2, corresponding to a thickness of the one or more output couplers 918. When the one or more couplers 918 are located adjacent to second optical surface 914 and inside optical waveguide 910, the thickness of the one or more output couplers 918 is less than or equal to a thickness of the waveguide 910 (e.g., L2≤L1).

In some embodiments, the optical waveguide is configured to receive, through the slanted facet of the optical waveguide, light in a fifth direction that is non-perpendicular to the slanted facet of the optical waveguide. The optical waveguide is also configured to steer, at the grating at the slanted facet of the optical waveguide, the light toward the first optical surface in a sixth direction that is non-parallel to the fifth direction (e.g., slanted facet 916 is configured to receive light and grating 940, located at slanted facet 916, is configured to steer the light into optical waveguide 910). The first optical surface of the optical waveguide is configured to reflect the light steered, at the grating at the slanted facet of the optical waveguide, in a seventh direction for propagation within the optical waveguide. The one or more output couplers 918 are configured to redirect at least a portion of the light impinging on the one or more output couplers for transmission out of the optical waveguide through the first optical surface of the optical waveguide (e.g., optical surface 912 is configured to reflect light inside optical waveguide 910, steered by grating 940, towards the one or more output couplers 918 and the one or more output couplers 918 are configured to redirect at least a portion of the light for transmission out of optical waveguide 910 through optical surface 912).

As shown in FIG. 9A, optical device 900 is capable of directing light with large input angles (e.g., ray 434 entering prism 440 at input angle 454-1) from the light projector (e.g., light projector 422) to the eyebox (e.g., eyebox 420) and/or the pupil 350 of the eye 340 of the user. Thus, optical device 900 has a larger FOV than optical device 400.

In some embodiments, as shown in FIG. 9B, optical device 900 includes an optically opaque material 960 (e.g., a light absorbing material or film) disposed on a third surface 954 of the one or more output couplers 918. The opaque material 960 is configured to block transmission of light and may reduce the presence of ghost images or optical artifacts.

In some embodiments, as shown in FIG. 9C, the one or more output couplers 918 have a thickness that is equal to or greater than half of a thickness of the waveguide 910 (e.g., L2>L1±2). In such cases, the optical device 900 may include an optional opaque material 962 (e.g., a light absorbing material or film) disposed within the waveguide 910. The opaque material 962 is configured to block transmission of light and may reduce the presence of ghost images or optical artifacts. In this configuration, light can be transmitted through the third surface 954 of the one or more couplers 918.

Several features described above, related to optical devices 500 and 501, can be applied to optical device 900 in analogous ways that would be clear to a person having ordinary skill in the art. Thus, the above described features are not repeated herein for brevity.

Although various drawings illustrate operations of particular components or particular groups of components with respect to one eye, a person having ordinary skill in the art would understand that analogous operations can be performed with respect to the other eye or both eyes. For brevity, such details are not repeated herein.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. An optical device, comprising:
   an optical waveguide having a first optical surface and a second optical surface opposite to the first optical surface, both the first optical surface and the second optical surface extending from a first end of the optical waveguide to a second end of the optical waveguide that is opposite to the first end of the optical waveguide, the optical waveguide also having a slanted facet adjacent to the first end of the optical waveguide, the slanted facet being non-parallel and non-perpendicular to the first optical surface and the second optical surface;

a reflector on the slanted facet of the optical waveguide; and a prism located adjacent to the first end of the optical waveguide and separate from the optical waveguide for directing light toward the reflector on the slanted facet so that the light reflected by the reflector propagates within the optical waveguide.

2. The device of claim 1, further comprising:
one or more output couplers located adjacent to the second optical surface.

3. The device of claim 2, wherein:
the one or more output couplers are configured to redirect light propagating within the optical waveguide from the first end of the optical waveguide toward the second end of the optical waveguide so that a first portion of the light is transmitted out of the optical waveguide through a first location of the first optical surface of the optical waveguide and a second portion of the light, distinct from the first portion of the light, is transmitted out of the optical waveguide through a second location of the first optical surface of the optical waveguide that is distinct and separate from the first location of the first optical surface of the optical waveguide.

4. The device of claim 2, wherein:
the one or more output couplers include a plurality of reflectors; and
a respective reflector of the plurality of reflectors is configured to redirect a respective portion of light propagating within the optical waveguide from the first end of the optical waveguide toward the second end of the optical waveguide so that the respective portion of the light is transmitted out of the optical waveguide through a corresponding location of the first optical surface of the optical waveguide.

5. The device of claim 2, wherein:
the one or more output couplers include a volume Bragg grating configured to direct respective portions of light propagating within the optical waveguide from the first end of the optical waveguide toward the second end of the optical waveguide so that a respective portion of the plurality of the light is transmitted out of the optical waveguide through a corresponding location of the first optical surface of the optical waveguide.

6. The device of claim 1, wherein:
the light received by the prism has a first angular spread;
at least a portion of the light transmitted through the first optical surface of the optical waveguide has a second angular spread;
the first optical surface of the prism and the second optical surface of the prism form an acute angle;
the slanted facet defines a facet angle with respect to the first optical surface; and
the facet angle and the acute angle of the prism are selected so that any light within the first angular spread is output through the first optical surface of the optical waveguide within the second angular spread that corresponds to the first angular spread.

7. The device of claim 1, wherein:
the prism includes a first optical surface and a second optical surface; and
the second optical surface of the prism is optically coupled with the first optical surface of the optical waveguide.

8. The device of claim 7, wherein:
the second optical surface of the prism is positioned substantially parallel to the first optical surface of the optical waveguide; and
the second optical surface of the prism is separated from the first optical surface of the optical waveguide by air.

9. The device of claim 1, wherein:
the device is substantially transparent to visible light.

10. The device of claim 1, wherein:
the light received by the prism is non-monochromatic.

11. The device of claim 1, wherein:
the optical waveguide has a length of at least 40 mm and a width of at least 40 mm.

12. The device of claim 11, wherein:
the prism has a length less than a width of the optical waveguide.

13. A display device, comprising:
a light projector; and
the device of claim 1.

14. The display device of claim 13, wherein:
the light projector is configured to project the light that corresponds to one or more images; and
the display device is configured to combine the light projected from the light projector and light from an outside of the display device for providing an overlap of the one or more images, projected from the light projector, and a real image that corresponds to the light from the outside of the display device.

15. The display device of claim 14, wherein:
the device is configured to expand the one or more images projected by the light projector to an eyebox that is larger than the one or more images on the light projector.

16. The display device of claim 13, wherein:
the display device is a head-mounted display device.

17. An optical device, comprising:
an optical waveguide having a first optical surface and a second optical surface opposite to the first optical surface, both the first optical surface and the second optical surface extending from a first end of the optical waveguide to a second end of the optical waveguide that is opposite to the first end of the optical waveguide, the optical waveguide also having a slanted facet adjacent to the first end of the optical waveguide, the slanted facet being non-parallel and non-perpendicular to the first optical surface and the second optical surface;

a reflector on the slanted facet of the optical waveguide;
a prism located adjacent to the first end of the optical waveguide and separate from the optical waveguide; and one or more output couplers located adjacent to the second optical surface, wherein:
the prism includes a first optical surface and a second optical surface;
the prism is configured to receive, through the first optical surface of the prism, light from a light projector in a first direction and steer the light from the light projector toward the optical waveguide in a second direction that is non-parallel to the first direction;
the optical waveguide is configured to receive, through the first optical surface of the optical waveguide, the light from the prism in the second direction that is non-perpendicular to the first optical surface of the optical waveguide and steer, at the first optical surface of the optical waveguide, the light toward the slanted facet in a third direction that is non-parallel to the second direction;

the reflector on the slanted facet is configured to reflect the light steered, at the first optical surface of the optical waveguide, in a fourth direction for propagation within the optical waveguide; and the one or more output couplers are configured to redirect at least a portion of the light impinging on the one or more output couplers for transmission out of the optical waveguide through the first optical surface of the optical waveguide.

18. The device of claim 17, wherein:

the light from the light projector impinges on the first optical surface of the prism at a zero angle of incidence; and the light redirected by the one or more output couplers impinges on the first optical surface of the optical waveguide at a zero angle of incidence.

19. An optical device, comprising:

an optical waveguide having a first optical surface and a second optical surface opposite to the first optical surface, the second optical surface being parallel to the first optical surface, both the first optical surface and the second optical surface extending from a first end of the optical waveguide to a second end of the optical waveguide that is opposite to the first end of the optical waveguide, the optical waveguide also having a slanted facet adjacent to the first end of the optical waveguide more than to the second end of the optical waveguide, the slanted facet being non-parallel and non-perpendicular to the first optical surface and the second optical surface, wherein:

the slanted facet includes a grating;

the first optical surface is a top surface of the optical waveguide; and the second optical surface is a bottom surface of the optical waveguide.

20. The device of claim 19, further comprising:

one or more output couplers located adjacent to the second optical surface.

* * * * *